(12) United States Patent
Hosotsubo

(10) Patent No.: US 9,069,504 B2
(45) Date of Patent: Jun. 30, 2015

(54) PRINTING APPARATUS AND METHOD FOR INCREASING STORAGE AREA

(75) Inventor: Toshihiko Hosotsubo, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 621 days.

(21) Appl. No.: 12/915,391

(22) Filed: Oct. 29, 2010

(65) Prior Publication Data
US 2011/0128572 A1 Jun. 2, 2011

(30) Foreign Application Priority Data
Dec. 2, 2009 (JP) ................................. 2009-274900

(51) Int. Cl.
G06F 3/12 (2006.01)

(52) U.S. Cl.
CPC .............. *G06F 3/1257* (2013.01); *G06F 3/122* (2013.01); *G06F 3/1287* (2013.01)

(58) Field of Classification Search
USPC .......................................................... 358/1.15
See application file for complete search history.

(56) References Cited

U.S. PATENT DOCUMENTS

| 2006/0274363 | A1* | 12/2006 | Katano | 358/1.15 |
| 2007/0146778 | A1* | 6/2007 | Kitagata et al. | 358/1.15 |
| 2008/0037060 | A1* | 2/2008 | Ono et al. | 358/1.15 |
| 2008/0118005 | A1* | 5/2008 | Yasuma | 375/316 |
| 2009/0066995 | A1* | 3/2009 | Mukund et al. | 358/1.15 |
| 2009/0128849 | A1* | 5/2009 | Sakura | 358/1.15 |
| 2009/0164668 | A1* | 6/2009 | Duckett | 710/9 |
| 2009/0180141 | A1* | 7/2009 | Takaishi et al. | 358/1.15 |
| 2009/0213415 | A1* | 8/2009 | Shozaki | 358/1.15 |
| 2009/0219576 | A1* | 9/2009 | Akiyama et al. | 358/1.16 |
| 2009/0237728 | A1* | 9/2009 | Yamamoto | 358/1.15 |
| 2009/0284785 | A1* | 11/2009 | Bando | 358/1.15 |

FOREIGN PATENT DOCUMENTS

| JP | 2000-242448 A | 9/2000 |
| JP | 2003-241922 A | 8/2003 |

* cited by examiner

*Primary Examiner* — Nicholas Pachol
(74) *Attorney, Agent, or Firm* — Carter, DeLuca, Farrell & Schmidt, LLP

(57) ABSTRACT

A printer performs printing based on a print setting related to a session ID. A Web application transmits print data to the printer together with the session ID. If a print setting related to the session ID is present, the printer performs printing based on the print setting. If no print setting related to the session ID is present, the printer prompts a connection destination to confirm the print setting related to the session ID. When the session ends, the printer deletes the print setting related to the session ID. With the above configuration, issues are solved.

14 Claims, 22 Drawing Sheets

FIG.6A

| SESSION ID 602 | PRINT SETTINGS 603 | 601 |
|---|---|
| SESSION ID | PRINT SETTINGS |
| 0A0A015F471E9B28006D | PRINT SETTING DATA AAA |
| ---- | ---- |
| ---- | ---- |
| ---- | ---- |

FIG.6B

| APP SESSION ID 612 | PRINT DATA 613 | 611 |
|---|---|
| APP SESSION ID | PRINT DATA |
| HJ45HI2EIOIPE003FGHIK | PRINT DATA XXX |
| ---- | ---- |
| ---- | ---- |
| ---- | ---- |

FIG.6C

| APP SESSION ID | PRINTER URL | PRINTER SESSION ID |
|---|---|---|
| NN78922EHIEHGU1368FE | http://172.xx.yy.zz/print | KEIGE791FGLM13ABNAQ |
| ---- | ---- | ---- |
| ---- | ---- | ---- |
| ---- | ---- | ---- |

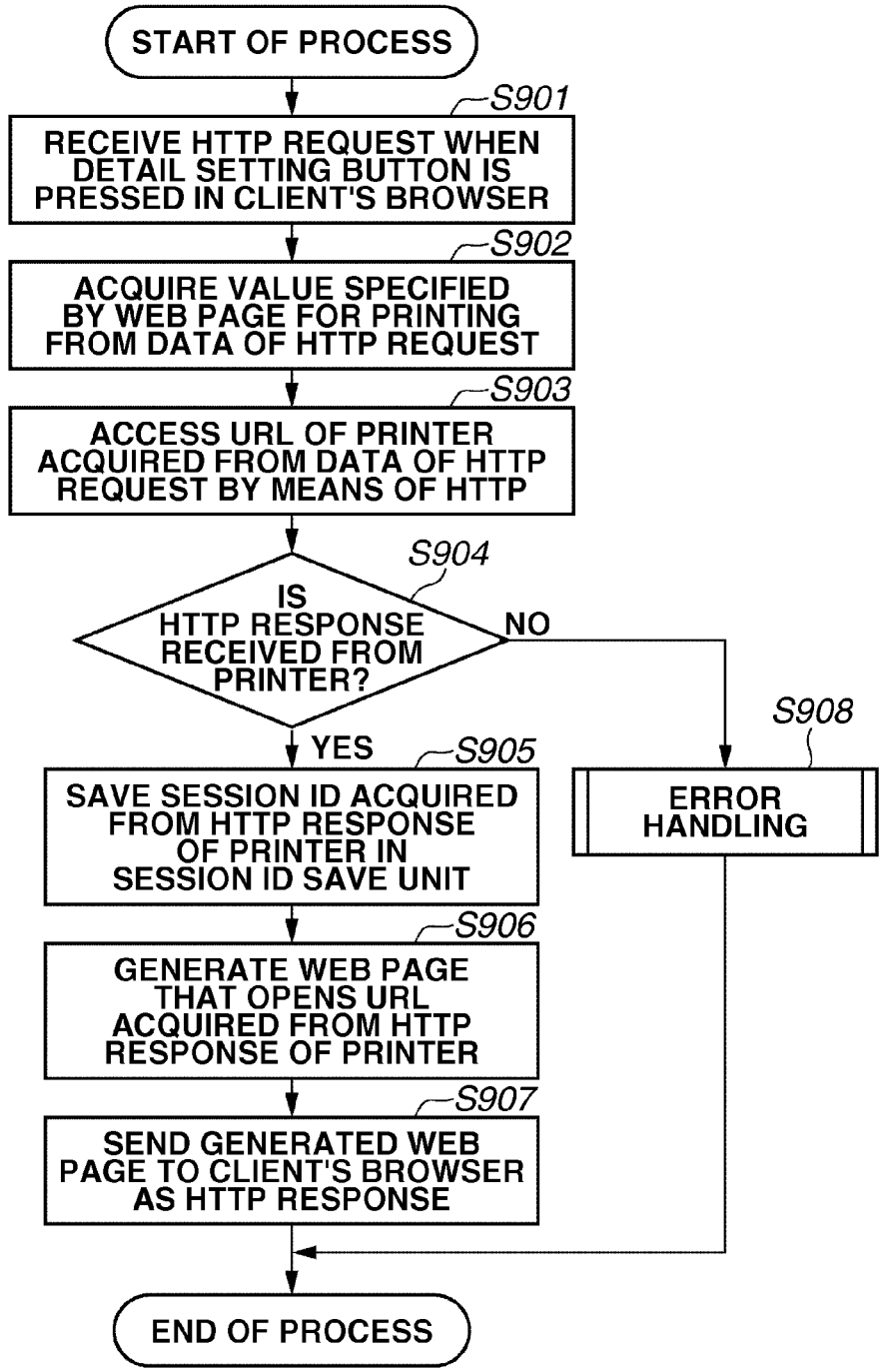

FIG.11C

WEB BROWSER – iR xxxx PRINT SETTINGS — 1101

PRINTER: http://172.xx.yy.zz/print
SESSION ID: 0A0A015F471E9B28006D

- SHEET SIZE: A3 — 1102
- SHEET ORIENTATION: PORTRAIT — 1103
- COLOR: COLOR — 1104
- PRINTING METHOD: BOOKBINDING PRINTING — 1105
- OPENING DIRECTION: LEFT OPENING — 1106
- PAGE LAYOUT: — 1107
- ARRANGEMENT ORDER: — 1108
- SHEET DISCHARGE DESTINATION: AUTO — 1109
- DISCHARGE METHOD: STAPLE SORTING — 1110
- STAPLE POSITION: UPPER LEFT — 1111
- NUMBER OF COPIES: 1 COPIES — 1112

SETTINGS — 1113
CANCEL — 1114
CLOSE — 1115

United States Patent US 9,069,504 B2

PRINTING APPARATUS AND METHOD FOR INCREASING STORAGE AREA

BACKGROUND OF THE INVENTION

1. Field of the Invention

The present invention relates to a printing apparatus, a printing method, and a storage medium.

2. Description of the Related Art

Conventional desk-top applications have been increasingly changed to Web applications. A Web application is used by users by accessing a Web application server that provides the Web application. Moreover, there are some methods of printing a document created by a Web application using printer specific functions (for example, staple sorting, and bookbinding printing).

In recent years, technologies that access a printer via a Web browser to register print parameters specifying printer specific functions of the printer together with a registration identifier (ID) have been discussed (e.g., Japanese Patent Application Laid-Open No. 2000-242448).

Moreover, technologies by which print data and a print setting that sets printer specific functions are sent to a printer and the printer issues a job ID in a one-to-one correspondence to the print setting have been discussed (e.g., Japanese Patent Application Laid-Open No. 2003-241922).

However, according to the technology discussed in Japanese Patent Application Laid-Open No. 2000-242448 or Japanese Patent Application Laid-Open No. 2003-241922, print settings registered in a printer remain saved in a storage area of the printer, causing an issue of a storage area shortage of the printer.

According to the technology discussed in Japanese Patent Application Laid-Open No. 2000-242448 or Japanese Patent Application Laid-Open No. 2003-241922, it is necessary for the user to remember content assigned to the registration ID or job ID. Thus, if the user forgets what print setting is made by a registration ID or job ID is, the relevant ID remains in the printer without being used, causing an issue of a storage area shortage of the printer by registration IDs or job IDs as unnecessary registration information.

SUMMARY OF THE INVENTION

According to an aspect of the present invention, an image forming apparatus includes a storage unit that stores the print setting information in a storage device by associating with a connection ID based on a print setting request containing the connection ID identifying a connection between the printing apparatus and a print request source and the print setting information, a print control unit that acquires the print setting information from the storage device and performs control so that the print data is printed based on the acquired print setting information if determined that the print setting information associated with the connection ID is stored in the storage device based on a print request containing the connection ID identifying the connection between the printing apparatus and the print request source and the print data, and a deletion unit that deletes the print setting information from the storage device if determined that the print setting information associated with the connection ID is stored in the storage device based on a connection termination request containing the connection ID identifying the connection between the printing apparatus and the print request source.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6A is a diagram illustrating a table configuration of a Web print setting registration unit according to an exemplary embodiment of the present invention.

FIG. 6B is a diagram illustrating a table configuration of a print data temporary storage unit according to an exemplary embodiment of the present invention.

FIG. 6C is a diagram illustrating a table configuration of a session ID save unit according to an exemplary embodiment of the present invention.

FIG. 9 is a flow chart illustrating processing concerning the Web application server according to an exemplary embodiment of the present invention.

FIGS. 11A, 11B, and 11C are diagrams illustrating a UI concerning print settings of the printer according to an exemplary embodiment of the present invention.

DESCRIPTION OF THE EMBODIMENTS

Various exemplary embodiments, features, and aspects of the invention will be described in detail below with reference to the drawings.

Figure 1:
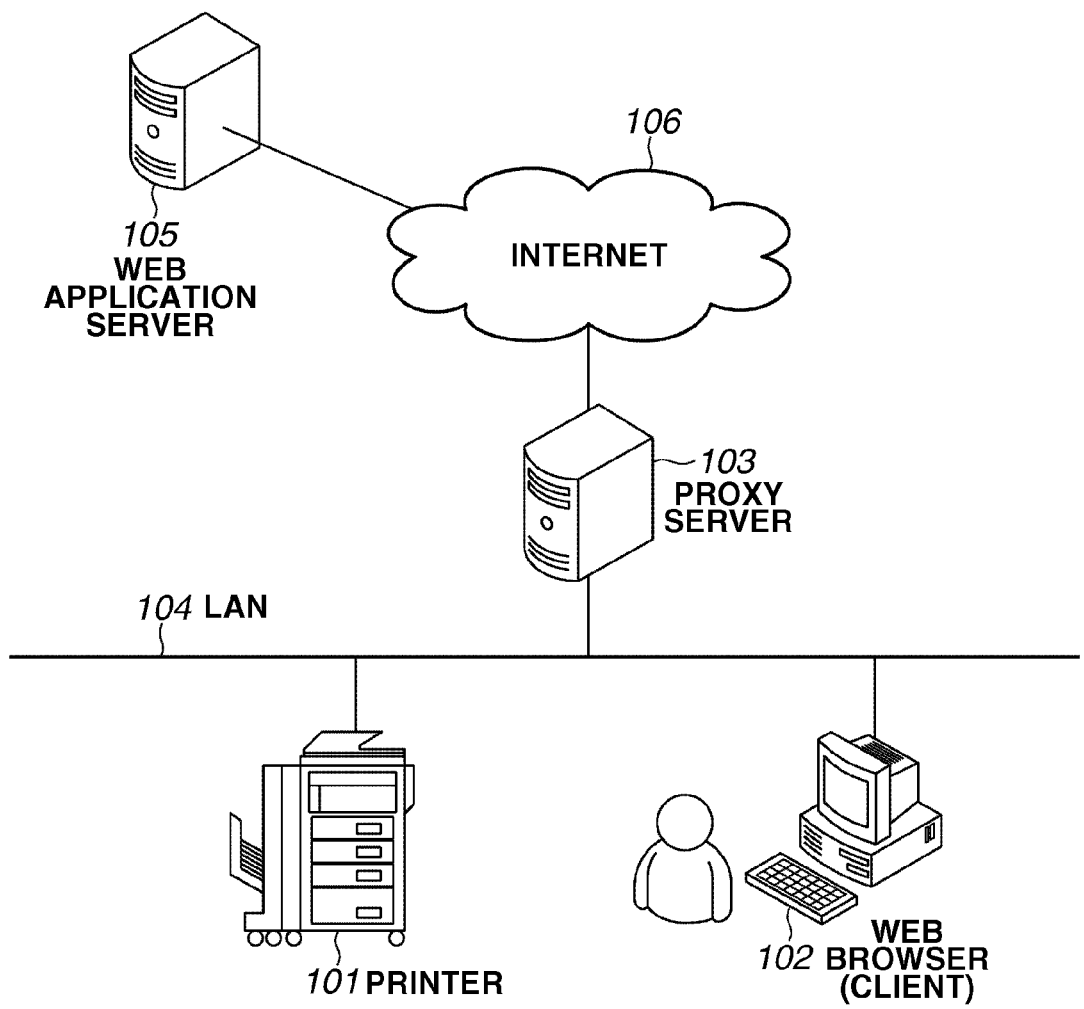
FIG. 1 is a diagram illustrating a system configuration according to an exemplary embodiment of the present invention.

FIG. 1 is a diagram illustrating a configuration of a system according to the present exemplary embodiment. The present system includes a printer 101, a client (client personal computer (PC)) 102, a proxy server 103, a local area network (LAN) 104, and a Web application server 105.

The printer 101 is an example of a printing apparatus and is present in the LAN 104. The client PC 102 is an example of a client terminal apparatus, is present on the LAN 104, and operates a Web browser. The proxy server 103 is present on the LAN 104, and acts as a proxy of another computer (such as the client PC 102 and the printer 101) present in the LAN 104 to directly communicate with computers on an Internet 106.

The LAN 104 is, for example, an intranet that is not directly connected to the Internet. The Web application server 105 is an example of a server apparatus, and provides a service of Web applications to the Web browser or the like operating on the client PC 102. The service is provided by an information providing method executed by the Web application server 105.

Instead of the configuration in which the printer 101 and the client PC 102 are connected to the Internet 106 via the proxy server 103, a configuration in which the printer 101 and the client PC 102 are directly connected to the Internet 106 may be adopted. In such a case, the proxy server 103 and the LAN 104 can be excluded from the configuration of the above system.

If not specifically mentioned, it is assumed that when data is transmitted from a computer (device) on the LAN 104 to a device on the Internet 106, transmission and reception are performed via the proxy server 103, but the operation of the proxy server 103 will not be mentioned.

Figure 2:
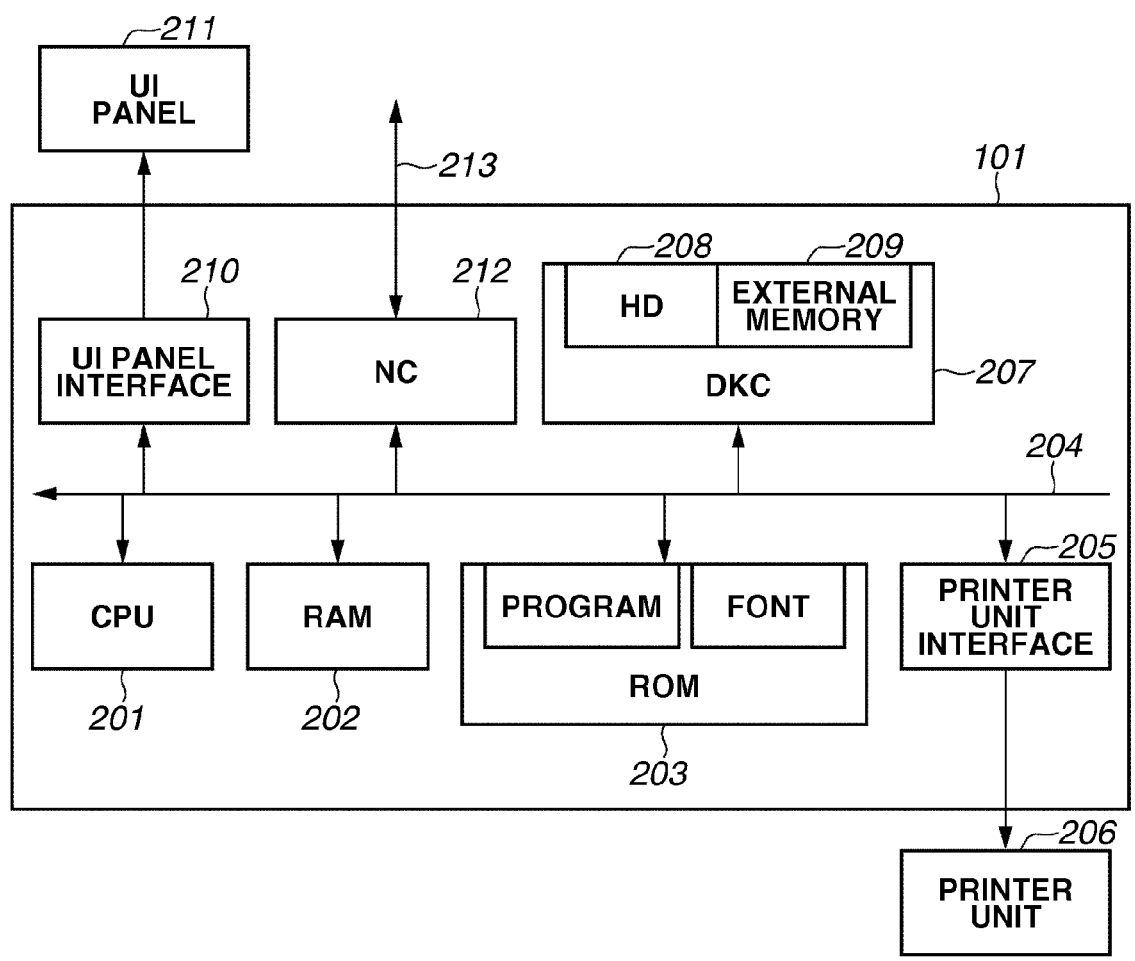
FIG. 2 is a block diagram illustrating a hardware configuration of a printer according to an exemplary embodiment of the present invention.

FIG. 2 is a block diagram illustrating a hardware configuration of the printer 101.

The printer 101 includes a central processing unit (CPU) 201, a random access memory (RAM) 202, a read-only memory (ROM) 203, a system bus 204, a printer engine interface (printer unit interface) 205, and a disk controller (DKC) 207. The printer 101 further includes a hard disk (HD) 208, an external memory 209, a UI panel interface (operation panel user interface) 210, and a network controller (NC) 212.

The CPU 201 controls access to various devices connected to the system bus 204 collectively based on a control program stored in a program ROM of the ROM 203 or a control program stored in the external memory 209. The CPU 201 also outputs an image signal and a control signal to a printer engine (printer unit) 206 connected via the printer unit interface 205.

The RAM 202 functions as a main memory or a work area of the CPU 201, and the memory capacity can be increased by an optional RAM to be connected to an expansion port (not illustrated). The RAM 202 is also used as an output information rasterization area, environment data storage area, non-volatile random access memory (NVRAM), and the like.

The DKC 207 controls access to the hard disk 208 and the external memory 209. The hard disk 208 stores user information, print data, and the like. The external memory 209, such as a universal serial bus (USB) memory, integrated circuit (IC) card, and/or the like, is connected to the printer 101 as an option.

The operation panel interface 210 delivers information input in the UI panel 211 to other components, and receives various kinds of information from other components via the system bus 204 to transmit it to the UI panel 211. The NC 212 connects the printer 101 to a network via a predetermined network interface 213 to perform communication control processing with other network devices.

In the present exemplary embodiment, various control programs to operate the printer 101 are stored at least in one storage unit of the program ROM of the ROM 203 and the external memory 209, and are executed by the CPU 201. In other words, by processing performed by the CPU 201 according to a procedure of a control program (for example, a print program) stored in the storage unit, the function of the printer 101 and processing according to a flow chart described below are realized.

Figure 3:
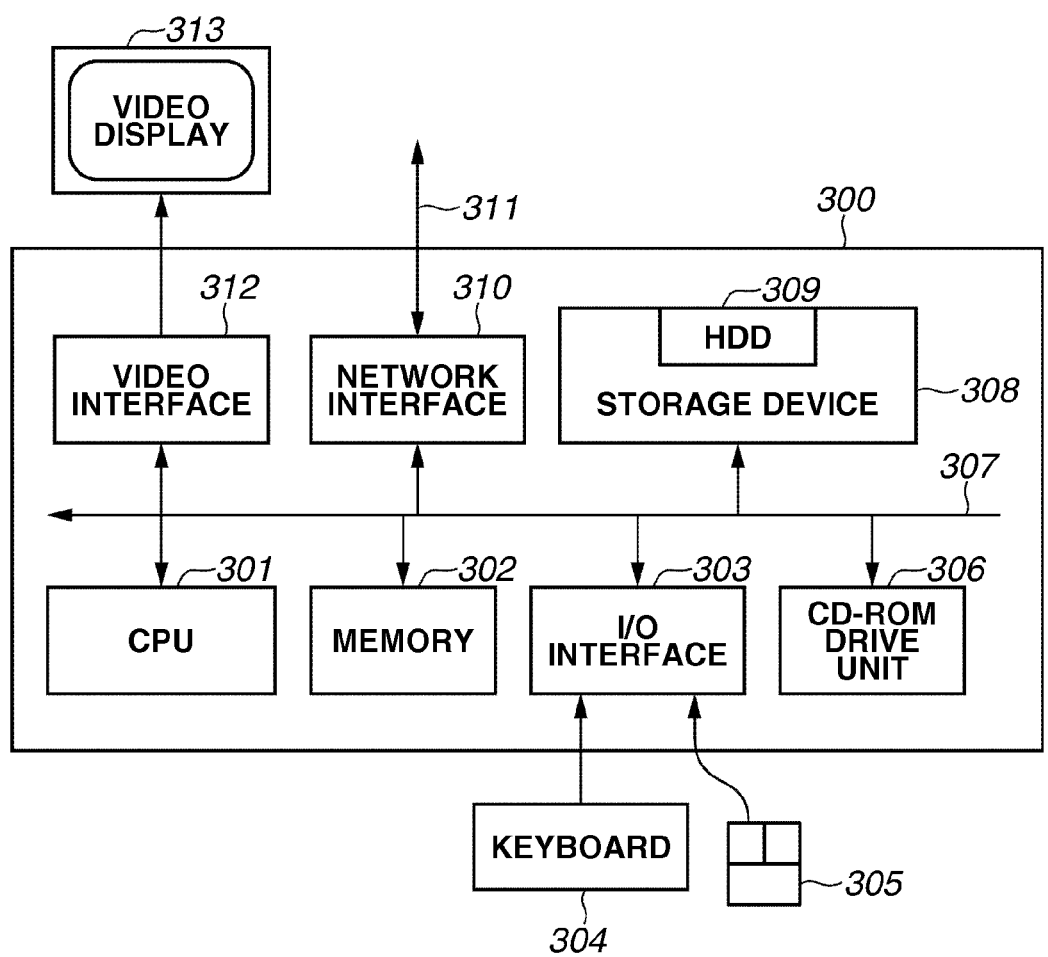
FIG. 3 is a block diagram illustrating a hardware configuration of a general-purpose computer according to an exemplary embodiment of the present invention.

FIG. 3 is a diagram illustrating a hardware configuration of a general-purpose computer 300, such as the client PC 102, the proxy server 103, and the Web application server 105. An input apparatus such as a keyboard 304 and a pointing device like a mouse 305, and an output apparatus, such as a display apparatus (video display) 313, are connected to the general-purpose computer 300.

The general-purpose computer 300 includes a CPU 301, a memory 302, an input/output (I/O) interface 303, a CD-ROM drive unit 306, and an interconnection bus 307. The general-purpose computer 300 further includes a storage device 308, a network interface 310, and a video interface 312.

The CPU 301 includes at least one processor. The memory 302 includes a RAM, ROM, and the like. The I/O interface 303 accepts input caused by an operation of the keyboard 304, the mouse 305, or the like.

The CD-ROM drive unit 306 is used as a nonvolatile data source. The interconnection bus 307 is used for communication between blocks performed by the CPU 301 according to an operating system such as Microsoft Windows® and LINUX® running on the general-purpose computer 300.

The storage device 308 includes a hard disk drive (HDD) 309. A silicon drive (not illustrated) may be included as the storage device 308.

The network interface 310 can connect the general-purpose computer 300 to another computer, the printer 101 or the like via a network connection 311. The network connection 311 is a local area network (LAN) connection or a wide area network (WAN) connection such as the Internet. The video interface 312 outputs images to the display apparatus 313.

Various control programs to operate the client PC 102 and the Web application server 105 are stored at least in one storage unit of the memory 302 and the storage device 308, and are executed by the CPU 301 of each.

For example, by processing performed by the CPU 301 according to a procedure of a control program (for example, a Web server program) stored in the storage unit, the function of the Web application server 105 and processing according to a flow chart described below are realized.

Moreover, for example, by processing performed by the CPU 301 according to a procedure of a control program (for example, a client program) stored in the storage device 308, the function of the client PC 102 or the like is realized.

Figure 4:
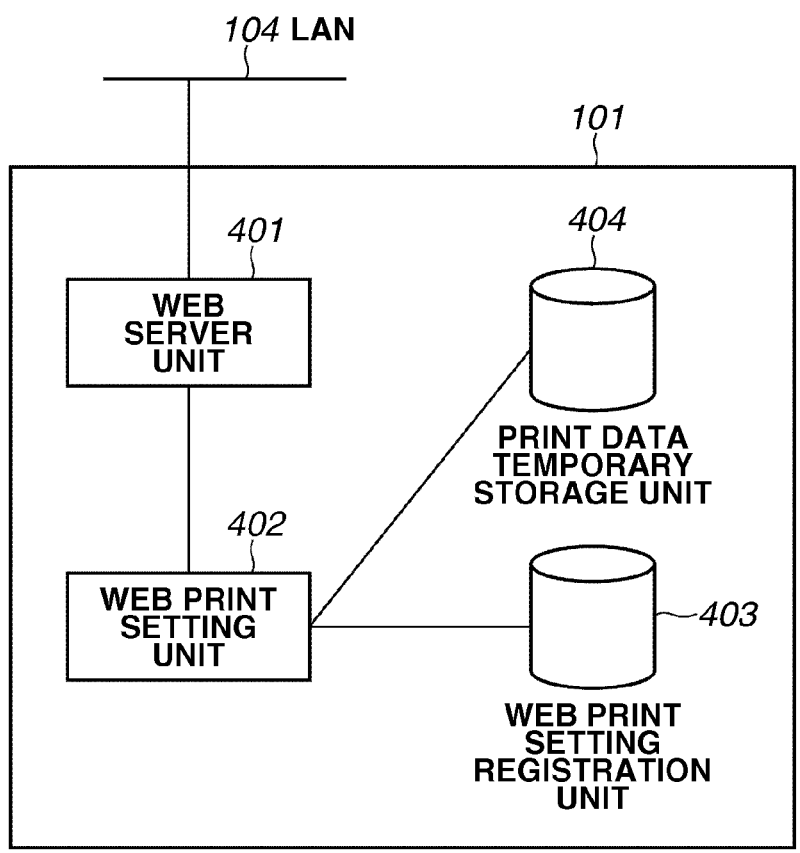
FIG. 4 is a block diagram illustrating a configuration of the printer according to an exemplary embodiment of the present invention.

FIG. 4 is a block diagram illustrating a configuration of the printer 101. The printer 101 includes a Web server unit 401, a Web print setting unit 402, a Web print setting registration unit 403, and a print data temporary storage unit 404.

The Web server unit 401 receives a Hyper-Text Transfer Protocol (HTTP) request or the like specified by a Uniform Resource Locator (URL) to acquire a Web page from the Web browser operating on the client PC 102 or the like, and returns information of the Web page or the like to the Web browser as an HTTP response.

If connection is established in response to a new HTTP request from the client PC 102, the Web server unit 401 generates (issues) a session ID to manage the session of the connection established by the new HTTP request. The session ID is an example of a connection ID, and identifies the connection between the printer 101 and the Web application server 105, which is an example of a print request source.

The Web print setting unit 402 constructs a Web page concerning print settings according to the printing capabilities of the printer 101, and provides the constructed Web page to the client PC 102 via the Web server unit 401. The printing capabilities of the printer 101 are capabilities of making various print settings such as a color setting, two-sided setting, paper setting, bookbinding setting, and staple setting. The Web print setting unit 402 generates a Web page for performing print settings for each session for which a session ID is issued.

The Web print setting registration unit 403 saves print settings (print setting information) that are associated with the session ID. The print data temporary storage unit 404 temporarily stores print data that is associated with the session ID.

Control programs to control the Web server unit 401 and the Web print setting unit 402 are stored at least in one storage unit of the program ROM of the ROM 203 and the external memory 209 of the printer 101, and executed by the CPU 201.

The Web print setting registration unit 403 and the print data temporary storage unit 404 are constructed on the hard disk 208 of the printer 101 and controlled by the CPU 201 of the printer 101 via the DKC 207.

Figure 5:
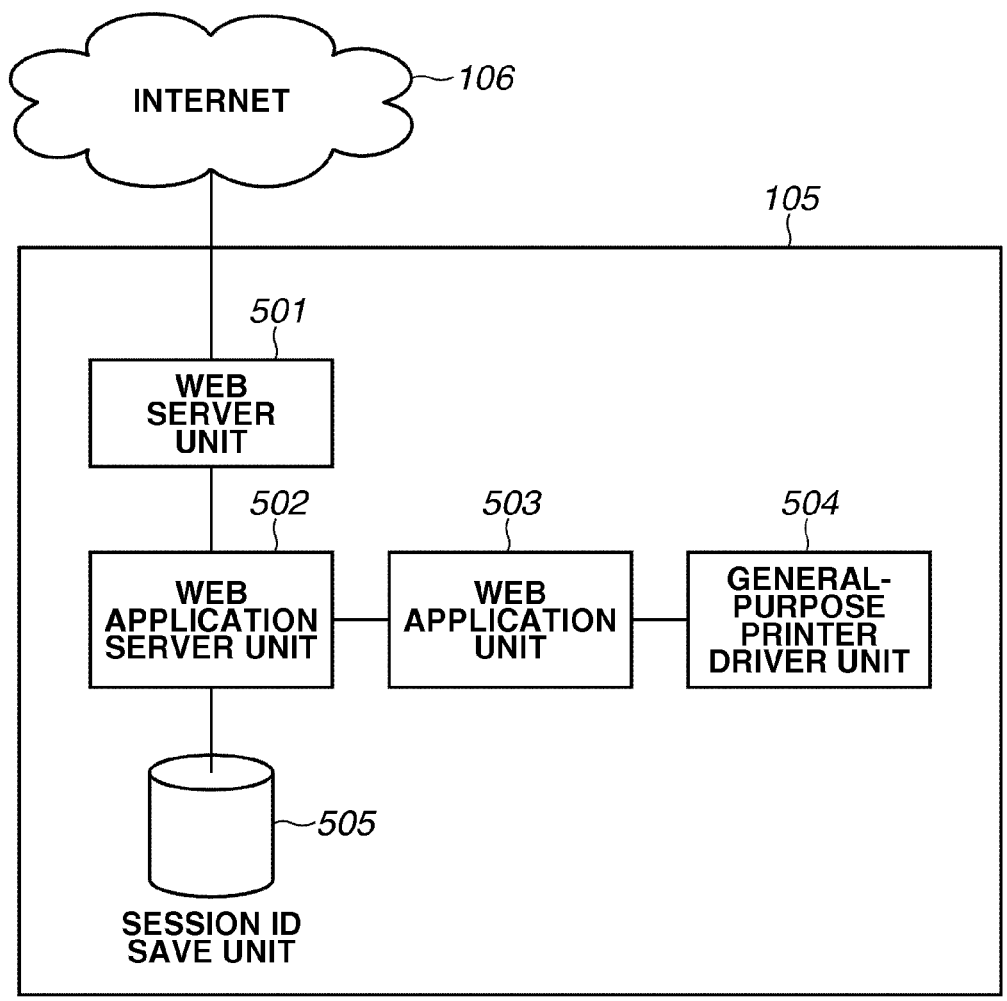
FIG. 5 is a block diagram illustrating a configuration of a Web application server according to an exemplary embodiment of the present invention.

FIG. 5 is a diagram illustrating a configuration of the Web application server 105.

The Web application server 105 includes a Web server unit 501, a Web application server unit 502, a Web application unit 503, a general-purpose printer driver unit 504, and a session ID save unit 505. The Web server unit 501 is similar to the Web server unit 401 of the printer 101 and thus, the description thereof will not be repeated.

The Web application server unit 502 provides a service of the Web application unit 503 to the Web browser of the client PC 102. The Web application server unit 502 accepts Web access of an unspecified large number of users via the Web server unit 501 to provide the service of the Web application unit 503 in units of access.

The Web application unit 503 is a service engine that provides document creation applications, such as a document editing application and a form creation application. The general-purpose printer driver unit 504 converts data specific to a document creation application to data in a general format, such as Portable Document Format (PDF)/XML Paper Specification (XPS)/Scalable Vector Graphics (SVG), in response to a request from the Web application unit 503.

The session ID save unit 505 saves the session ID received from the Web server unit 401 of the printer 101. The session ID save unit 505 is constructed on a hard disk of the HDD 309 of the Web application server 105 and is controlled by the CPU 301 of the Web application server 105.

Control programs to control the modules 501 to 504 are stored at least in one storage unit of the memory 302 and the storage device 308 of the Web application server 105 and executed by the CPU 301.

As described above, the Web application server 105 includes the general-purpose printer driver unit 504, and does not include a printer driver of a specific printer. Thus, there is no need for the Web application server 105 to provide printer drivers for an unspecified larger number of users so that management costs of printer drivers can be reduced.

FIG. 6A is a diagram illustrating a configuration of a table 601 in the Web print setting registration unit 403 constructed on the hard disk 208 of the printer 101.

A session ID column 602 stores the value of a session ID. In a print setting column 603, setting values of various print settings, which are associated to the session ID stored in the session ID column, such as the color setting, two-sided setting, paper setting, bookbinding setting, and staple setting that can be used by the printer 101 are stored.

FIG. 6B is a diagram illustrating a configuration of a table 611 in the print data temporary storage unit 404 constructed on the hard disk 208 of the printer 101.

A session ID column 612 stores the value of a session ID. A print data column 613 stores print data. More specifically, the print data associated with the session ID stored in the session ID column 612 is stored in the print data column 613.

FIG. 6C is a diagram illustrating a configuration of a table 621 in the session ID save unit 505 constructed on the hard disk of the HDD 309 of the Web application server 105.

An application session ID column (App session ID column) 622 holds the value of the session ID used by the Web application server 105 for session management with the Web browser using a Web application. A printer URL column 623 stores a URL (character string) of the printer 101. More specifically, the URL of the printer 101 associated with the session ID stored in the application session ID column 622 is stored in the printer URL column 623.

A printer session ID column 624 holds the value of the session ID received from the Web server unit 401 of the printer 101. More specifically, the session ID associated with both the session ID stored in the application session ID column 622 and the URL of the printer 101 stored in the printer URL column 623 is stored in the printer session ID column 624.

Here, the session ID is an ID to identify whether a client transmitting an HTTP request is a client connected to the Web server. The connection by a socket using the HTTP protocol is a stateless connection that does not maintain the state. Thus, each time transmission/reception of an HTTP request and an HTTP response to the HTTP request is ended, the connection is cut off.

Thus, the Web server uses the session ID to identify whether the client that transmits an HTTP request is the same client as that in the last session. This is one general method for session management in the connection using HTTP.

For the first connection from a client, the Web server issues a session ID and delivers the session ID to the client. The client that has received the session ID embeds the received session ID in the URL or a request header of an HTTP request before delivering the HTTP request to the Web server.

The Web server holds one-time or more frequent transmission/reception with the client performed using the same session ID as one piece of session information. When an explicit session termination notification is received from the client or a timeout occurs, session information used for the session is discarded.

It is assumed that a period in which session information is held is defined as a connection, and the connection is defined to be terminated when the session information including the session ID has been deleted.

Figure 7:
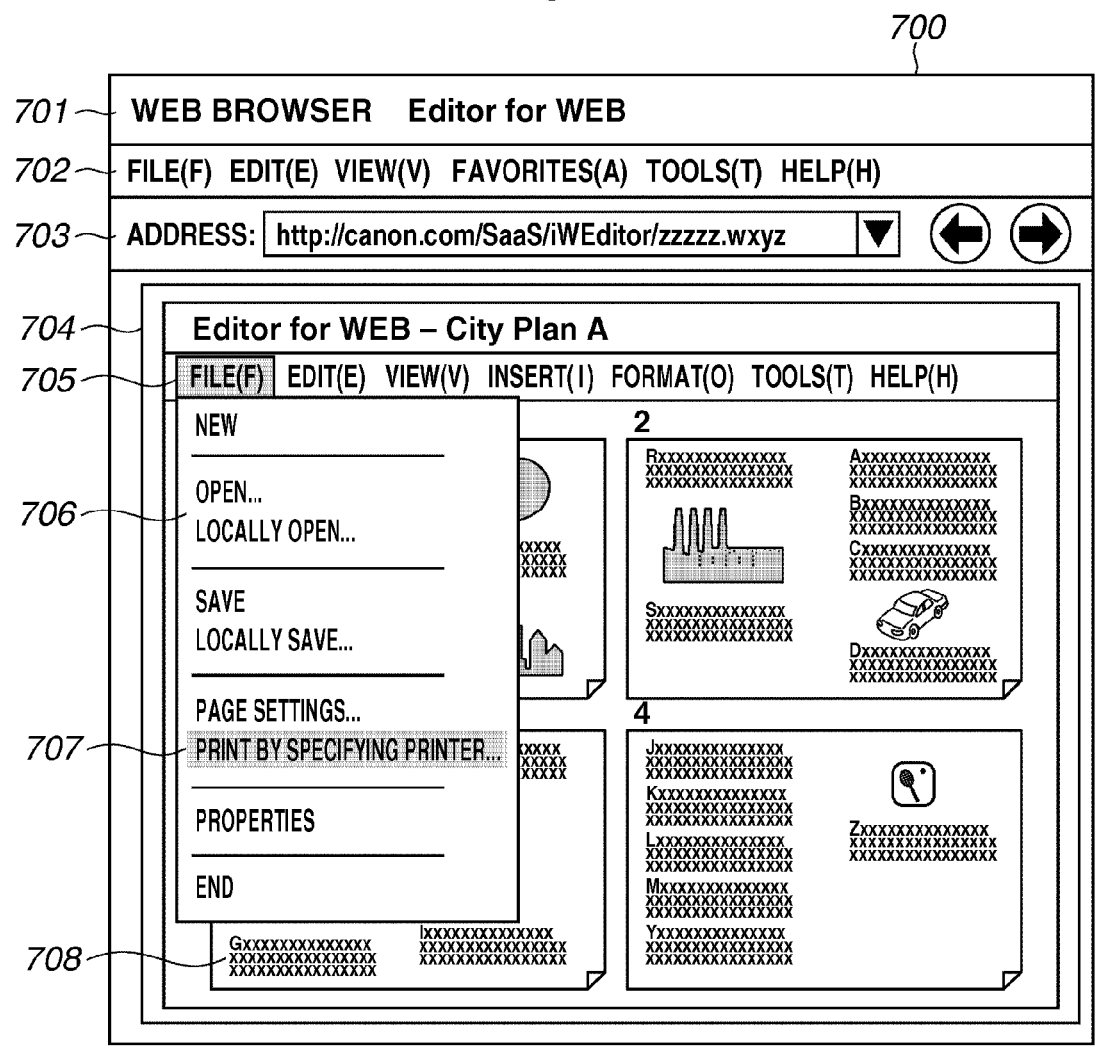
FIG. 7 is a diagram illustrating a user interface (UI) concerning print settings of the printer according to an exemplary embodiment of the present invention.

FIG. 7 is a diagram illustrating a user interface (UI) for print instructions provided by the Web application server 105.

A Web browser 700 is an example of the UI displayed on the client PC 102. The Web browser 700 includes a window 701, a menu of the Web browser 700, an address bar 703, and a frame 704.

The frame 704 includes a menu 705 of a Web application, a [File] menu 706, a [Print by Specifying Printer . . . ] menu item 707, and a document 708.

A program to operate the Web browser 700 resides in the hard disk of the client PC 102, and is executed by the CPU 301 of the client PC 102. The Web browser 700 is also a JavaScript® compatible browser and can execute a JavaScript code described in a Web page.

The URL of the Web application server 105 is specified by the address bar 703 to use the Web application. If execution of printing is selected in the menu 702 of the Web browser 700, the display state of the frame 704 is printed as it is. Thus, a printing result depends on the display state of the frame 704.

The menu 705 and the [File] menu 706 of a Web application are provided by the Web application server 105. Selecting [File] from items in the menu 705 causes a state in which the [File] menu is expanded.

The [Print by Specifying Printer . . . ] menu item 707 is a menu item of the [File] menu 706 of a Web application provided by the Web application server 105. When the [Print by Specifying Printer . . . ] menu item 707 is selected, the Web application is instructed to do printing. The document 708 is a document to be edited by the Web application. The document 708 is edited according to instructions from the user operating the Web browser.

When the [Print by Specifying Printer . . . ] menu item 707 is selected by the user, the Web browser 700 transmits the HTTP request corresponding to the selection of the [Print by Specifying Printer . . . ] menu item 707 to the Web application server 105.

The Web application server 105 that has received the HTTP request corresponding to the selection of the [Print by Specifying Printer . . . ] menu item 707 generates a Web page (a window 801 in FIG. 8B) for print instructions and transmits the Web page to the Web browser 700 as an HTTP response.

The Web browser 700 that has received the HTTP response opens the new window 801 described below to display the Web page for print instructions contained in the HTTP response and provided by the Web application server unit 502.

If the [Print by Specifying Printer . . . ] menu item 707 of the Web application is selected to instruct printing, the printing function of the Web browser is not used. Thus, printing that does not depend on the display state of the frame 704 of the Web browser 700 can be performed.

Figure 8A:
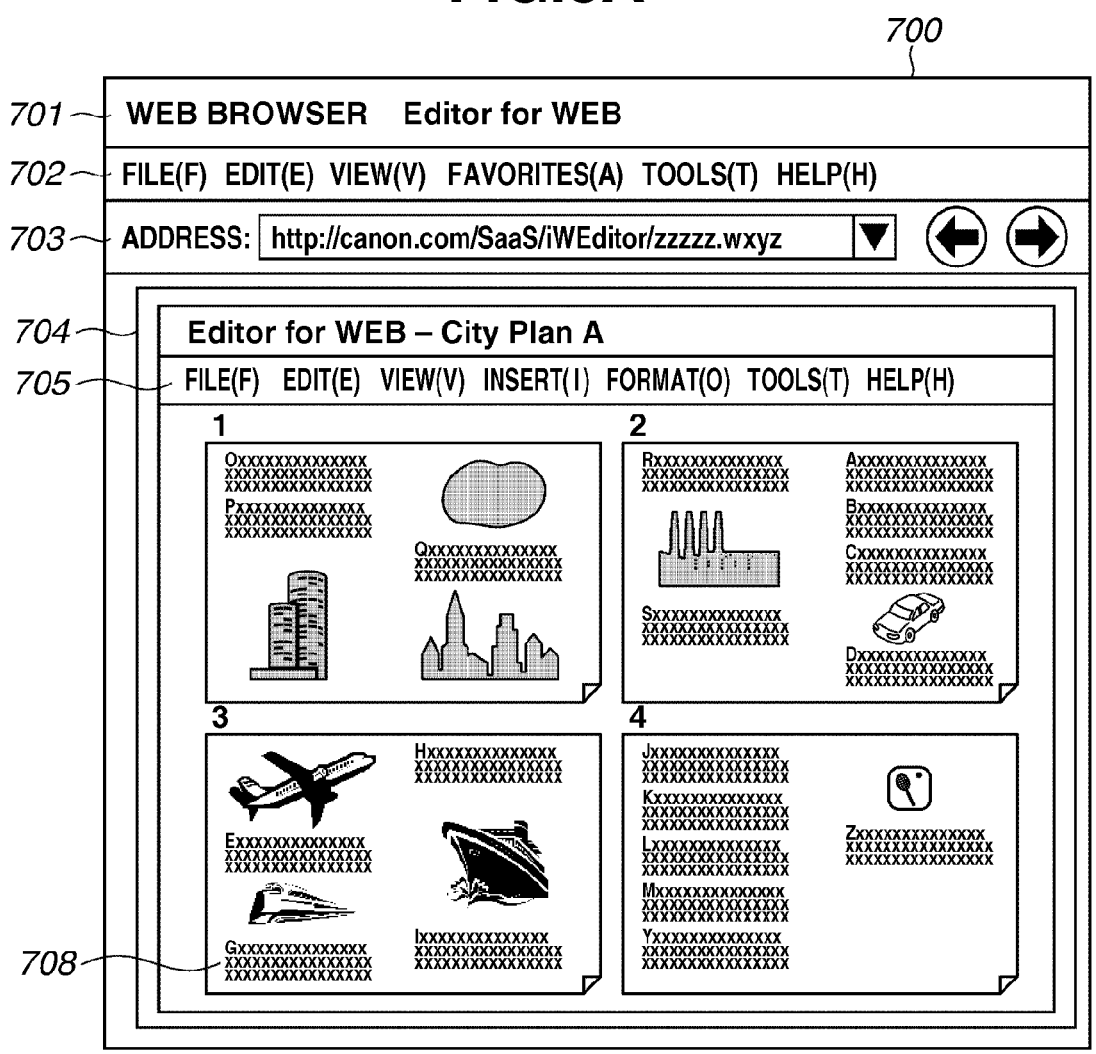
FIGS. 8A and 8B are diagrams illustrating UIs concerning print settings of the printer according to an exemplary embodiment of the present invention.
Figure 8B:
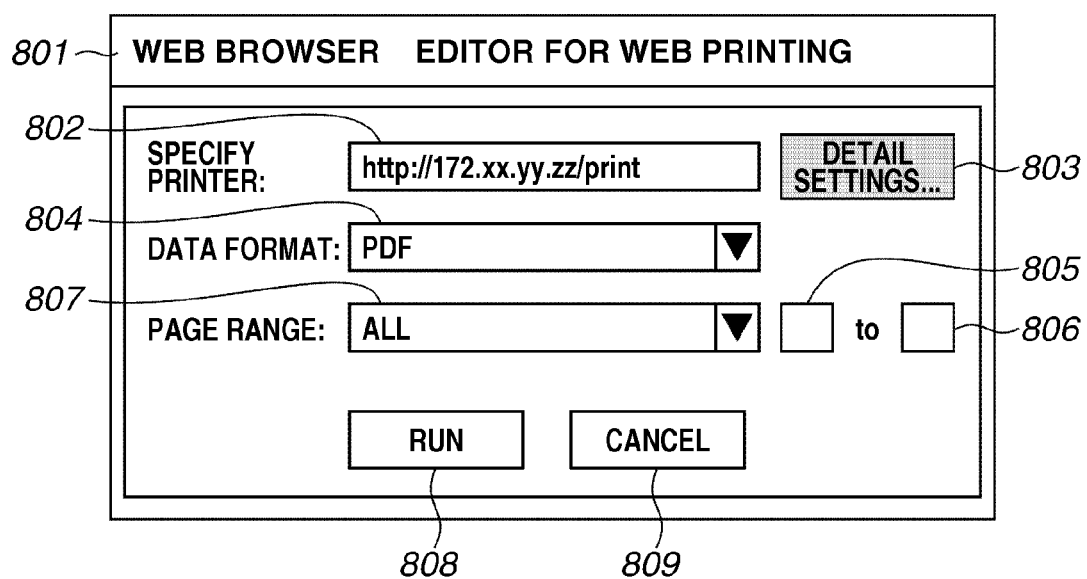

FIG. 8B is a diagram illustrating a Web page for print instructions (UI) of a Web application in the Web browser 700, shown in FIG. 8A, of the client PC 102. The window 801 includes a textbox 802, a details setting button 803, pull-down list boxes 804 and 807, textboxes 805 and 806, an execution (RUN) button 808, and a cancel button 809.

The window 801 is a new window of the Web browser 700 and is displayed as a Web page for print instructions of the Web application. If, as described above, the [Print by Specifying Printer . . . ] menu item 707 of the Web application is selected, the window 801 is displayed after an HTTP response is received from the Web application server unit 502.

The textbox 802 is a textbox to specify the URL of the printer 101 to be the destination (transmission destination) to which print data is transmitted. The details setting button 803 is a button to make print settings for the printer 101. The details setting button 803 can be pressed after the URL (string) of the printer 101 is input into the textbox 802.

The pull-down list box 804 receives the specified data format of the print data to be transmitted to the printer 101. Strings indicating the type of general format such as PDF, XPS, and SVG that can be output by the general-purpose printer driver unit 504 are listed in a pull-down list to be selectable.

The textboxes 805 and 806 receive a specified range to print the document 708. The number of the start page is specified in the textbox 805 and the number of the end page in the textbox 806. The pull-down list box 807 receives a specified range of the print data of the print the document 708.

The execution button 808 can be pressed after the URL (character string) of the printer 101 is input into the textbox 802. The cancel button 809 is a button to cancel execution of printing. If the cancel button 809 is pressed, the window 801 displaying the Web page for print instructions is closed.

FIG. 9 is a flow chart illustrating processing concerning the Web application server 105 when the user presses the details setting button 803 in the Web browser 700. In the present exemplary embodiment, processing of a flow chart executed by the Web application server 105 is realized by a program related to the flow chart being read from the memory and executed by the CPU 301 of the Web application server 105.

In step S901, the Web application server unit 502 of the Web application server 105 receives an HTTP request after the details setting button 803 is pressed from the Web browser 700 via the Web server unit 501. The HTTP request is an example of a print setting screen request.

In step S902, the Web application server unit 502 acquires the value of a URL of the printer 101 set to the textbox 802 of the Web page for print instructions from the data of the HTTP request.

In step S903, the Web application server unit 502 transmits an HTTP request to acquire a Web page concerning the print settings of the printer 101 specified by the URL acquired from the data of the HTTP request to the printer 101. The Web application server unit 502 is an example of an acquisition request transmission unit, and the Web page concerning print settings is an example of screen information concerning the print settings.

In step S904, the Web application server unit 502 receives an HTTP response containing information of the session ID to the HTTP request and the URL of the Web page concerning the print settings of the printer 101 from the Web server unit 401 of the printer 101 (YES in step S904).

The session ID is issued by the Web server unit 401 of the printer 101, and the URL of the Web page concerning print settings corresponds to and specific to the issued session ID. If no HTTP response is received (NO in step S904), in step S908, an error processing is performed.

In step S905, the Web application server unit 502 saves the session ID received from the Web server unit 401 of the printer 101 in the session ID save unit 505. The Web application server unit 502 saves the session ID received from the printer 101 after associating with two pieces of information, i.e., the session ID used for session management with the Web browser 700 that uses the Web application, and the URL of the printer 101.

In step S906, the Web application server unit 502 generates a Web page for accessing the URL of the Web page concerning print the settings received from the Web server unit 401 of the printer 101. The Web application server unit 502 is an example of a creation unit.

In step S907, the Web application server unit 502 returns the generated Web page to the Web browser 700 as an HTTP response when the details setting button 803 is pressed. The Web application server unit 502 is an example of a response transmission unit.

Figure 10:
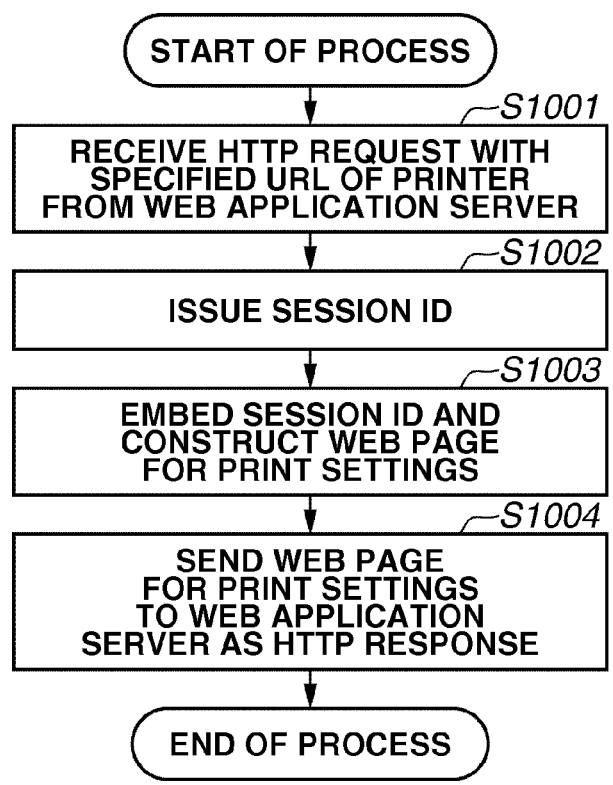
FIG. 10 is a flow chart illustrating processing concerning the printer according to an exemplary embodiment of the present invention.

FIG. 10 is a flow chart illustrating processing concerning the printer 101 when accessed from the Web application server unit 502 of the Web application server 105 by using HTTP (step S903). This is a flow chart of the printer 101 corresponding to the flow chart illustrated in FIG. 9. In the present exemplary embodiment, processing of the flow chart executed by the printer 101 is realized by a program related to the flow chart being read from the memory and executed by the CPU 201 of the printer 101.

In step S1001, the Web server unit 401 of the printer 101 receives an HTTP request to acquire a Web page concerning the print settings for the printer 101 specified by the URL from the Web application server unit 502. The HTTP request is an example of an acquisition request.

In step S1002, the Web server unit 401 of the printer 101 issues a new session ID to start session management with the Web application server unit 502 of the Web application server 105.

The Web server unit 401 of the printer 101 delivers the newly issued session ID to the Web print setting unit 402. In step S1003, the Web print setting unit 402 constructs a Web page concerning the print settings of the printer 101 in which the session ID is embedded.

In step S1004, the Web server unit 401 of the printer 101 returns the Web page (response) concerning the print settings constructed by the Web print setting unit 402 to the Web application server unit 502 of the Web application server 105 as an HTTP response. The Web server unit 401 is an example of an acquisition request response transmission unit.

If, in step S907, when the Web browser 700 opens the Web page received from the Web application server unit 502, the Web page concerning the print settings specific to the session ID issued by the Web server unit 401 of the printer 101 is opened. That is, a new window 1101 of the Web browser 700 is redirected to the Web page of the printer 101 generated by access of the Web application server unit 502. Redirection refers to transfer to another URL.

After the redirection, the Web page of the printer 101 is accessed by the Web browser 700 and the display in the new window 1101 of the Web browser 700 is updated based on the access result.

The Web browser 700 communicates with the Web server unit 401 of the printer 101 and the Web server unit 501 of the Web application server 105 to update the display of the windows 701, 801, and 1101 based on each communication result.

Figure 11A:
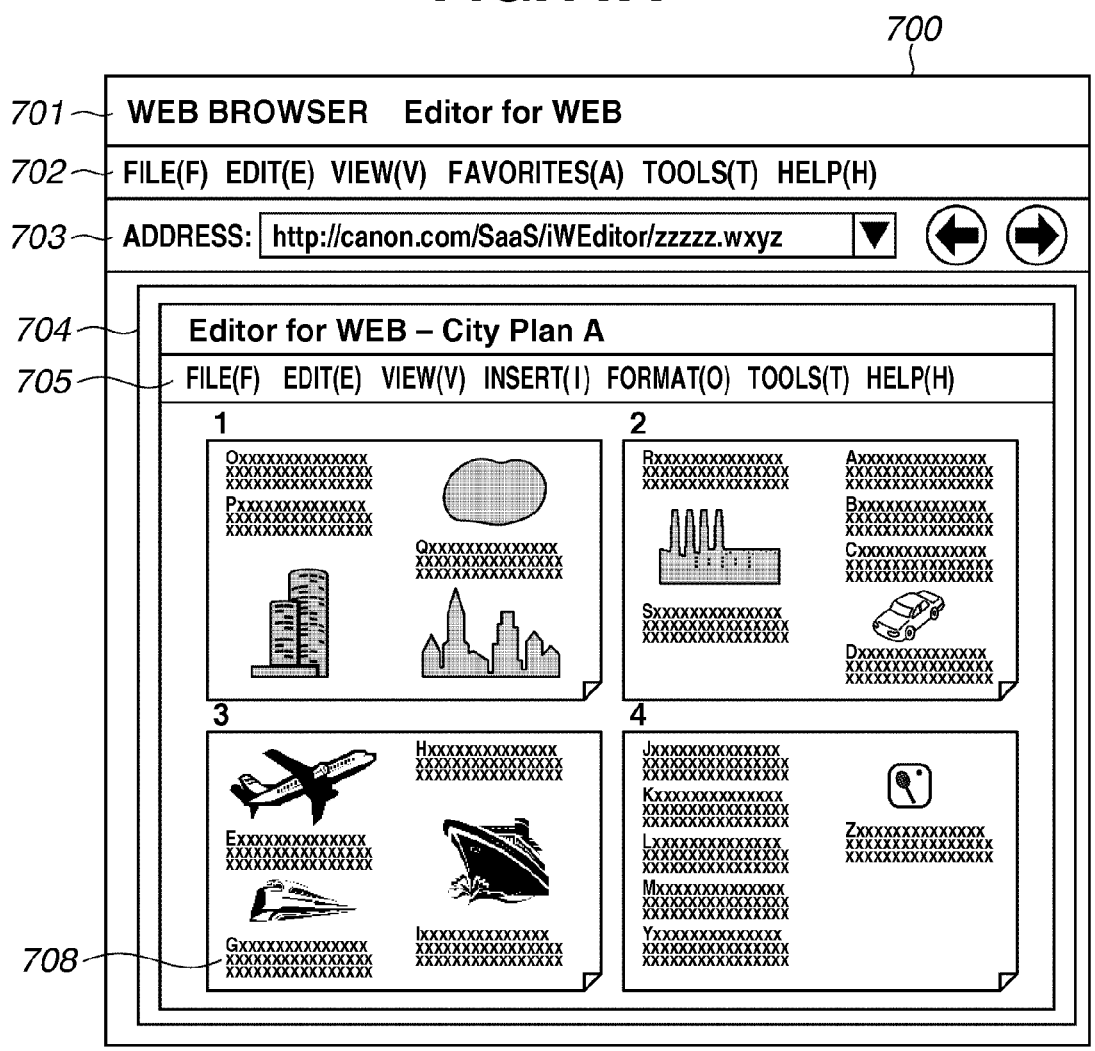
Figure 11B:
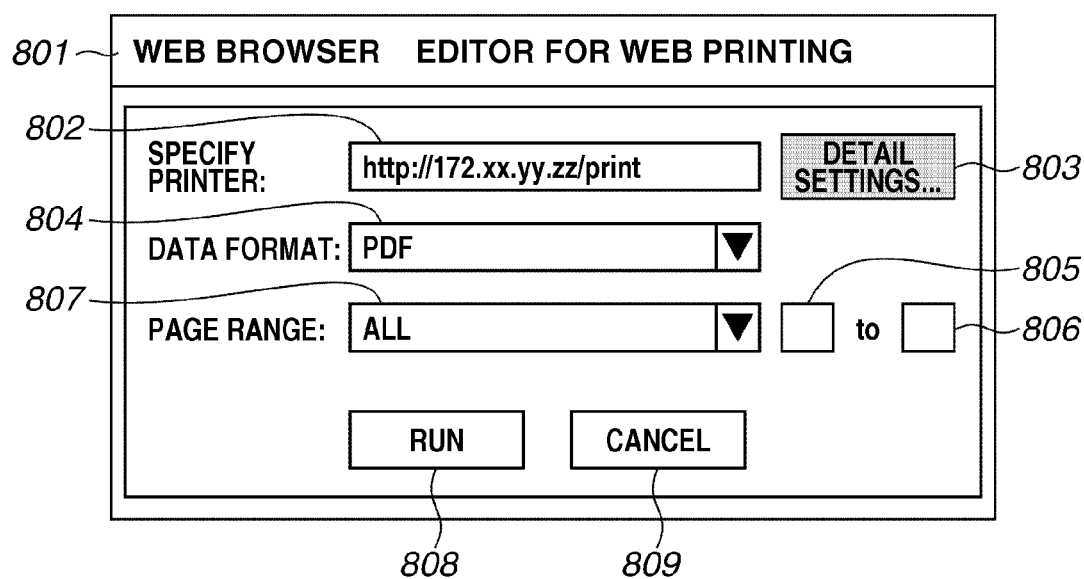

FIG. 11C is a diagram illustrating the Web page (UI) concerning print settings specific to the session ID of the printer 101 in the Web browser 700, shown in FIG. 11A, of the client PC 102. FIG. 11B is a diagram corresponding to FIG. 8B illustrating a Web page for print instructions (UI) of a Web application in the Web browser 700 of the client PC 102.

The window 1101 is an example of a print setting screen and includes pull-down list boxes 1102 to 1111, a textbox 1112, a setting button 1113, a cancel button 1114, and a close button 1115. In other words, the window 1101 is configured to be able to set print setting information and also configured to set the transmission destination of the print setting information to the printer 101.

The window 1101 is a new window of the Web browser 700. In the window 1101, the Web page concerning print settings of the printer 101 specific to the session ID issued by the Web server unit 401 of the printer 101 is displayed.

The pull-down list boxes 1102 to 1111 are pull-down list boxes to select the value of each print setting of the paper size, paper orientation, color, printing method, opening direction, page layout, arrangement order, sheet discharge destination, discharge method, and staple position.

The textbox 1112 is a textbox to set the value of print settings of the number of copies of the printer 101. A necessary initial value is set to each of the pull-down list boxes 1102 to 1111 and the textbox 1112. The setting button 1113 is a button to confirm the print settings of the printer 101.

The cancel button 1114 is a button to cancel print settings of the printer 101. When the cancel button 1114 is pressed, the Web print setting unit 402 of the printer 101 discards print settings in units of session confirmed after the setting button 1113 is pressed.

The close button 1115 is a button to close the window 1101. When the close button 1115 is pressed, the Web server unit 401 of the printer 101 discards session information with the Web browser 700 to terminate the connection with the Web browser 700. Moreover, the Web browser 700 discards information about the Web page concerning print settings specific to the session ID of the printer 101 before closing the window 1101.

The Web page concerning print settings is a Web page in which timer processing by JavaScript is performed, and an HTTP request of a page update is periodically made from the Web browser 700 of the client PC 102 to the Web server unit 401 of the printer 101.

Figure 12:
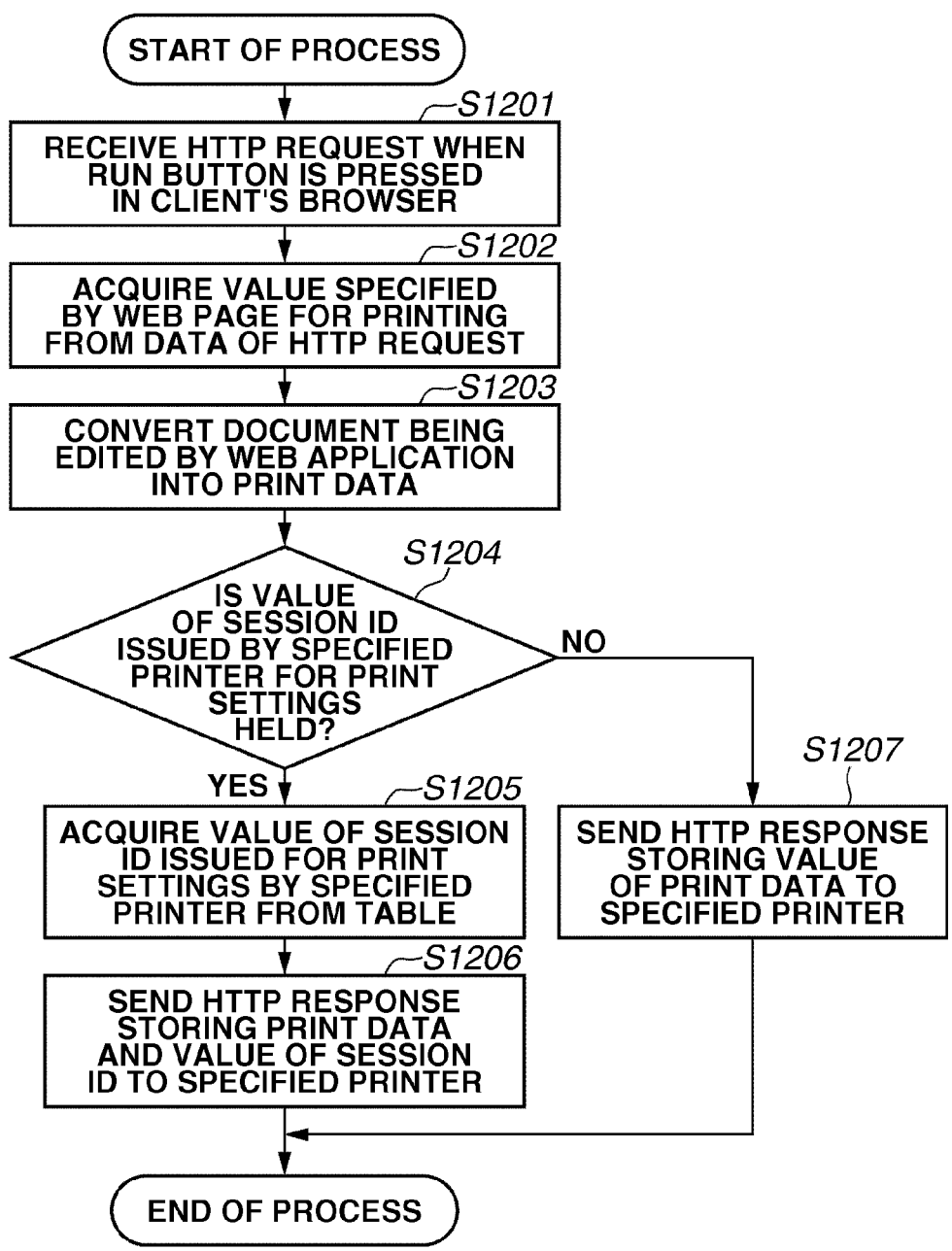
FIG. 12 is a flow chart illustrating processing concerning the Web application server according to an exemplary embodiment of the present invention.

FIG. 12 is a flow chart illustrating processing concerning the Web application server 105 when the execution button 808 for printing is pressed in the window 801 of the Web browser 700.

In step S1201, the Web application server unit 502 of the Web application server 105 receives an HTTP request when the execution button 808 is pressed from the Web browser 700 via the Web server unit 501.

In step S1202, the Web application server unit 502 acquires values specified by the textboxes 802, 805, and 806 and the pull-down list boxes 804 and 807 in the Web page of the window 801 from data of the HTTP request. With the processing in step S1202, the URL of the printer 101 used for printing, a data format of print data transmitted to the printer 101, and values of the print page range of a document are acquired.

In step S1203, the Web application server unit 502 uses the Web application unit 503 to convert the document 708 into a data format specified by the pull-down list box 804 to generate print data. More specifically, the Web application unit 503 uses the general-purpose printer driver unit 504 to perform the specified data conversion. The page range of the document 708 to be converted is the print page range specified by the textboxes 805 and 806 or the pull-down list box 807.

In step S1204, before the execution button 808 is pressed, the Web application server unit 502 determines whether a session ID issued by the Web server unit 401 of the printer 101 has been received after the details setting button 803 is pressed.

This determination is made based on information of the table 621 (FIG. 6C) of the session ID save unit 505. First, the Web application server unit 502 searches for the record (row) having the application session ID column 622 in which the value of the session ID with the Web browser 700 that has transmitted the HTTP request is stored.

Next, the Web application server unit 502 searches for the record having the printer URL column 623 in which the value of a URL of the printer 101 specified in the textbox 802 from among the records having the above applicable session ID.

That is, the Web application server unit 502 determines whether there is any record having values that satisfies both the application session ID column 622 and the printer URL column 623. If there is a record having values satisfying both columns, the Web application server unit 502 determines that the details setting button 803 has been pressed and a session ID issued by the Web server unit 401 of the printer 101 has been received (YES in step S1204).

Subsequently, in step S1205, the Web application server unit 502 acquires the value of the printer session ID column 624 from the table 621 of the session ID save unit 505. The value of the printer session ID column 624 to be acquired is a value of the printer session ID column 624 of a record having values satisfying both the application session ID column 622 and the printer URL column 623.

In step S1206, the Web application server unit 502 transmits an HTTP request containing the print data generated in step S1203 and the session ID acquired in step S1205 to the printer 101 having the URL acquired in step S1202. For example, the print data generated in step S1203 is stored in the body of the HTTP request, and the value of the session ID acquired from the printer session ID column in step S1205 in the header of the HTTP request.

On the other hand, if, in step S1204, the Web application server unit 502 determines that the details setting button 803 has been pressed and a session ID issued by the Web server unit 401 of the printer 101 has not been received (NO in step S1204), the processing proceeds to step S1207. In step S1207, the Web application server unit 502 transmits an HTTP request storing the print data generated in step S1203 in the body thereof to the printer 101 of the URL acquired in step S1202.

Figure 13:
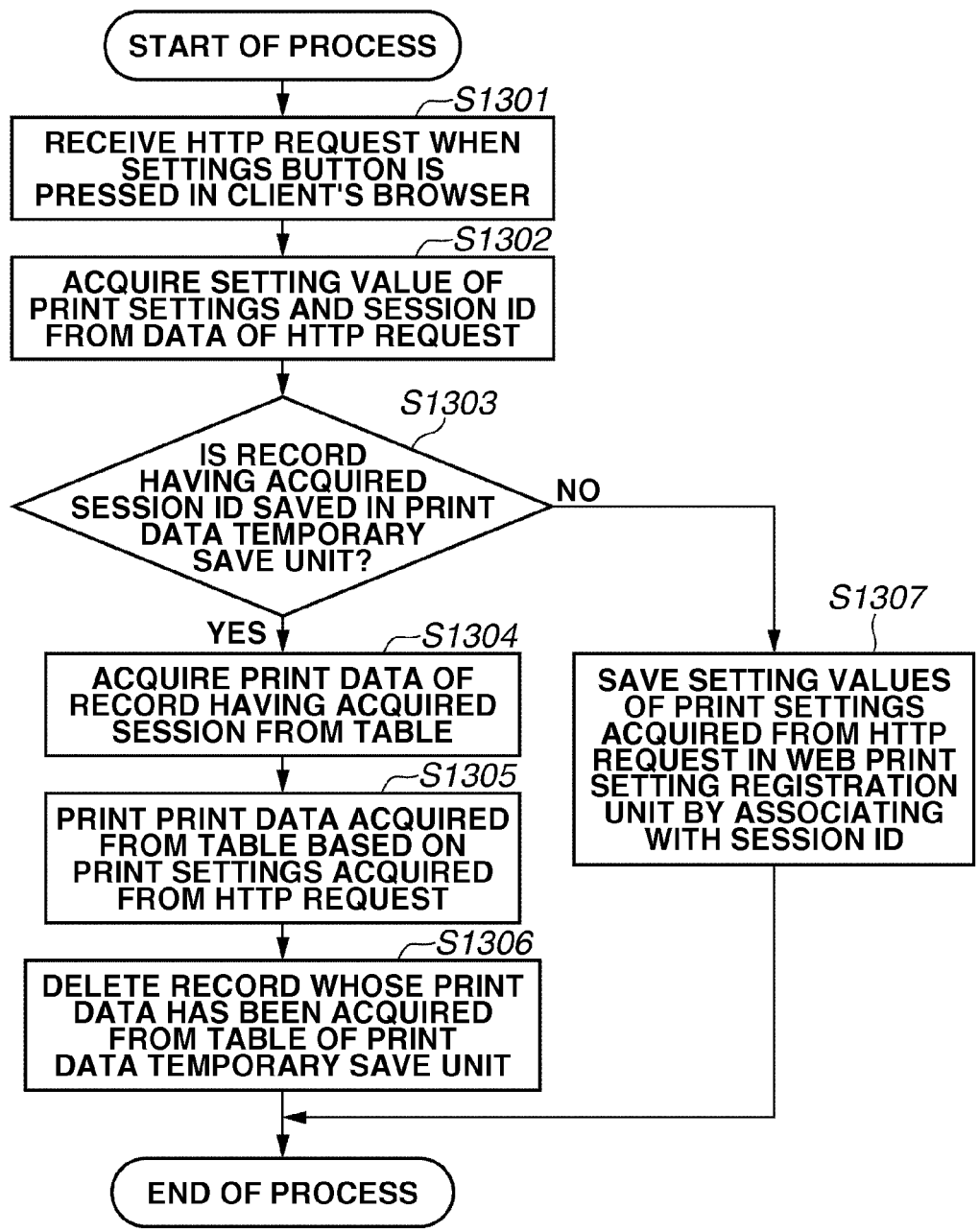
FIG. 13 is a flow chart illustrating processing concerning the printer according to an exemplary embodiment of the present invention.

FIG. 13 is a flow chart illustrating processing concerning the printer 101 when the setting button 1113 is pressed in the window 1101 of the Web browser 700.

In step S1301, the Web print setting unit 402 of the printer 101 receives an HTTP request when the setting button 1113 is pressed from the Web browser 700 via the Web server unit 401. The HTTP request is an example of a print setting request.

In step S1302, the Web print setting unit 402 acquires setting values of the print settings and the session ID from data of the HTTP request. More specifically, with the processing in step S1302, values specified by the pull-down list boxes 1102 to 1111 or the textbox 1112 of the Web page concerning the print settings displayed in the window 1101 of the Web browser 700 are acquired.

In step S1303, the Web print setting unit 402 determines whether there is any record having the session ID corresponding to the session ID acquired from the data of the HTTP request as a value of the session ID column 612 in the table 611 of the print data temporary storage unit 404.

If there is a record in the table 611 having the session ID corresponding to the acquired session ID in the session ID column 612 (YES in step S1303), in step S1304, the Web print setting unit 402 acquires print data from the print data column 613 of the record.

Subsequently, in step S1305, the Web print setting unit 402 outputs an image signal and a control signal to the printer unit 206 for printing via the printer unit interface 205 based on the acquired setting values of print settings, to print the print data acquired from the print data column 613.

Subsequently, in step S1306, the Web print setting unit 402 deletes the record from which the print data is acquired in step S1304 from the table 611 of the print data temporary storage unit 404.

If, on the other hand, the Web print setting unit 402 determines that there is no record in the table 611 having the session ID corresponding to the acquired session ID in the session ID column 612 (NO in step S1303), the processing proceeds to step S1307. In step S1307, the Web print setting unit 402 determines the session from the session ID acquired in step S1302, and saves the acquired setting values of the print settings in the table 601 of the Web print setting registration unit 403, which is associated with the session ID.

If there is a record in which the value of the corresponding session ID is stored in the session ID column 602, the Web print setting unit 402 overwrites the value of the print setting column 603 of the record. The Web print setting unit 402 is an example of a storage unit.

Figure 14:
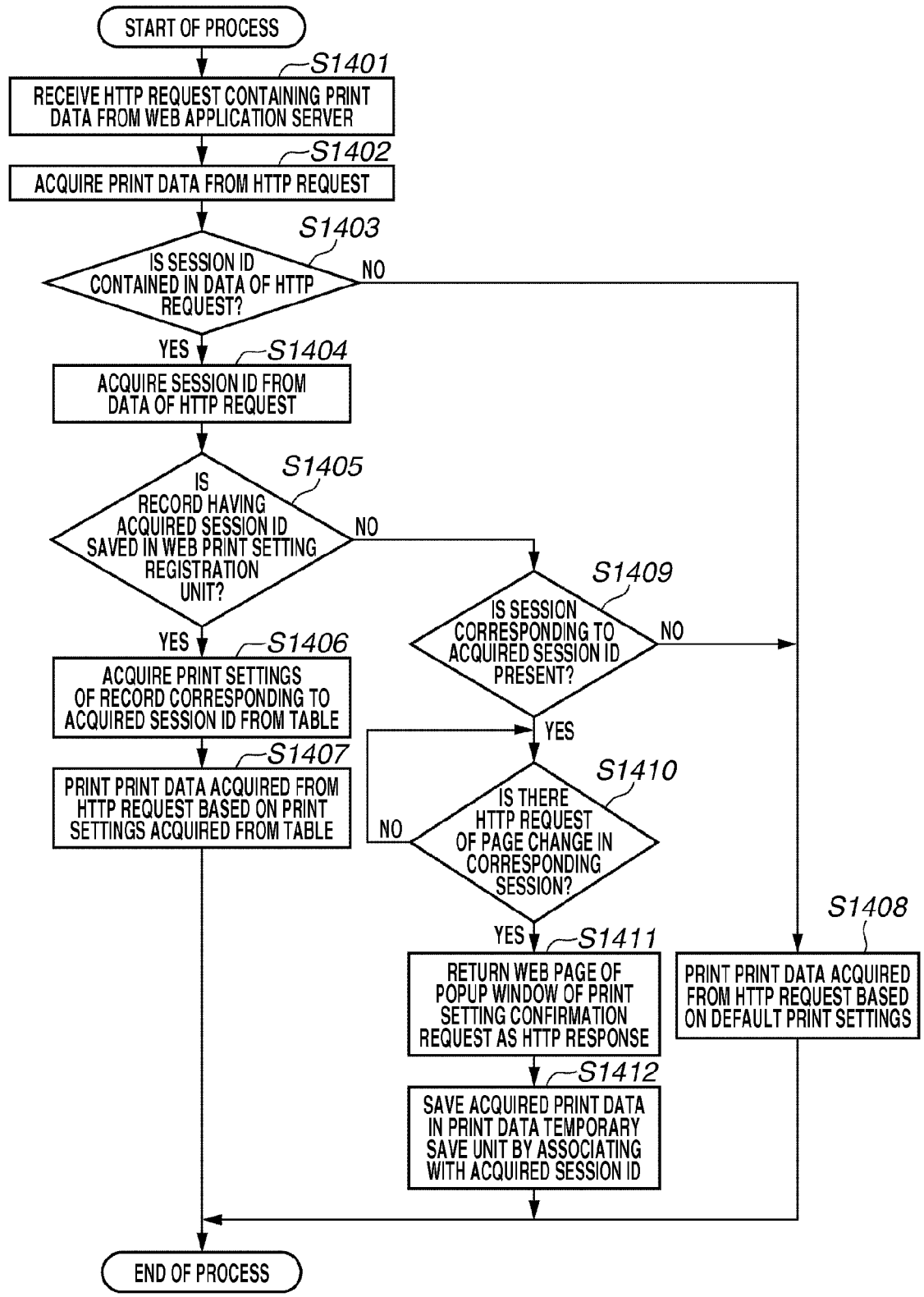
FIG. 14 is a flow chart illustrating processing concerning the printer according to an exemplary embodiment of the present invention.

FIG. 14 is a flow chart illustrating processing concerning the printer 101 when an HTTP request containing print data is received from the Web application server unit 502 of the Web application server 105. This is a flow chart of the printer 101 corresponding to the flow chart of the Web application server unit 502 illustrated in FIG. 12.

In step S1401, the Web print setting unit 402 of the printer 101 receives an HTTP request containing print data from the Web application server unit 502 of the Web application server 105 via the Web server unit 401. The HTTP request is an example of a printing request. In step S1402, the Web print setting unit 402 acquires the print data from the data of the HTTP request.

Subsequently, in step S1403, the Web print setting unit 402 determines whether any session ID is contained in the data of the HTTP request. If a session ID is contained in the data of the HTTP request (YES in step S1403), in step S1404, the Web print setting unit 402 acquires the contained session ID from the data of the HTTP request.

In step S1405, the Web print setting unit 402 determines whether there is any record having the session ID corresponding to the session ID acquired from the data of the HTTP request as a value of the session ID column 602 in the table 601 of the Web print setting registration unit 403.

If there is a record in the table 601 having the session ID corresponding to the acquired session ID in the session ID column 602 (YES in step S1405), in step S1406, the Web print setting unit 402 acquires print settings from the print setting column 603 of the record.

In step S1407, the Web print setting unit 402 outputs the print data acquired from the print setting column 603 as an image signal and a control signal to the printer unit 206 for printing via the printer unit interface 205 based on the acquired setting values of print settings acquired from the print setting column 603, to perform printing.

The Web print setting unit 402 is an example of a print control unit. If the Web print setting unit 402 determines that print setting information associated with the session ID is stored in the table 601, the Web print setting unit 402 performs control so that print data is printed based on the acquired print setting information.

If, on the other hand, the Web print setting unit 402 determines that there is no record in the table 601 having the session ID corresponding to the acquired session ID in the session ID column 602 (NO in step S1405), the processing proceeds to step S1409.

In step S1409, the Web print setting unit 402 determines whether the Web server unit 401 holds session information corresponding to the session ID based on the session ID acquired in step S1404. That is, the Web print setting unit 402 determines whether there is a session corresponding to the acquired session ID.

Then, if the Web print setting unit 402 determines that the Web server unit 401 holds session information corresponding to the session ID (YES in step S1409), the processing proceeds to step S1410. In step S1410, the Web print setting unit 402 determines whether any HTTP request of a page update has been received for the session ID.

If the HTTP request of the page update containing the session ID has been received (YES in step S1410), in step S1411, the Web print setting unit 402 returns a Web page to display a popup window 1501 described below and shown in FIG. 15B to the Web browser 700 when an HTTP response has been transmitted. In the popup window 1501, a message 1503 requesting to confirm print settings is displayed (see FIG. 15B). The Web print setting unit 402 is an example of a confirmation request screen transmission unit.

Subsequently, in step S1412, the Web print setting unit 402 saves the print data acquired in step S1402 in the table 611 of the print data temporary storage unit 404 of the printer 101 after associating with the session ID acquired in step S1404.

If, on the other hand, in step S1409, the Web print setting unit 402 determines that the Web server unit 401 does not hold session information corresponding to the session ID acquired in step S1404 (NO in step S1409), the Web print setting unit 402 performs processing in step S1408.

If, in step S1403, the Web print setting unit 402 determines that the data of the HTTP request contains no session ID (NO in step S1403), the Web print setting unit 402 performs processing in step S1408.

In step S1408, the Web print setting unit 402 outputs an image signal and a control signal to the printer unit 206 for printing via the printer unit interface 205 based on setting values of default print settings of the printer 101 to print the print data acquired in step S1402. The default print settings are print settings used by the printer 101 as standard settings when print settings from outside are omitted.

If, as illustrated in FIG. 11, a Web page concerning print settings is displayed in the window 1101, a Web page for print instructions is displayed in the window 801. In the present exemplary embodiment, both windows are operable by the user.

Thus, before print settings are confirmed by the setting button 1113 being pressed in the Web page concerning print settings of the window 1101, execution of printing may be instructed by the execution button 808 being pressed in the Web page for print instructions of the window 801.

Execution of printing may also be instructed by the execution button 808 being pressed in the Web page for print instructions of the window 801 while print settings of a session are discarded after the cancel button 1114 being pressed in the Web page concerning print settings of the window 1101.

In both cases, there is a possibility that even if the user selects to use a function specific to the printer 101 by pressing the details setting button 803, printing is instructed without using the specific function.

According to the processing in step S1409 to step S1412, if printing is done without print settings being confirmed by the user, the popup window 1501 prompting confirmation of print settings is opened in the Web browser 700 to give a warning. Therefore, a situation in which even if the details setting button 803 is pressed in the user interface for print instructions to make a selection to use a function specific to the printer 101, printing is done without the setting thereof being confirmed, can be avoided.

This is particularly effective when, like the present exemplary embodiment, the window 801 instructing execution of printing and the window 1101 executing print settings display different Web server pages, and can reduce operation errors by the user.

Figure 15A:
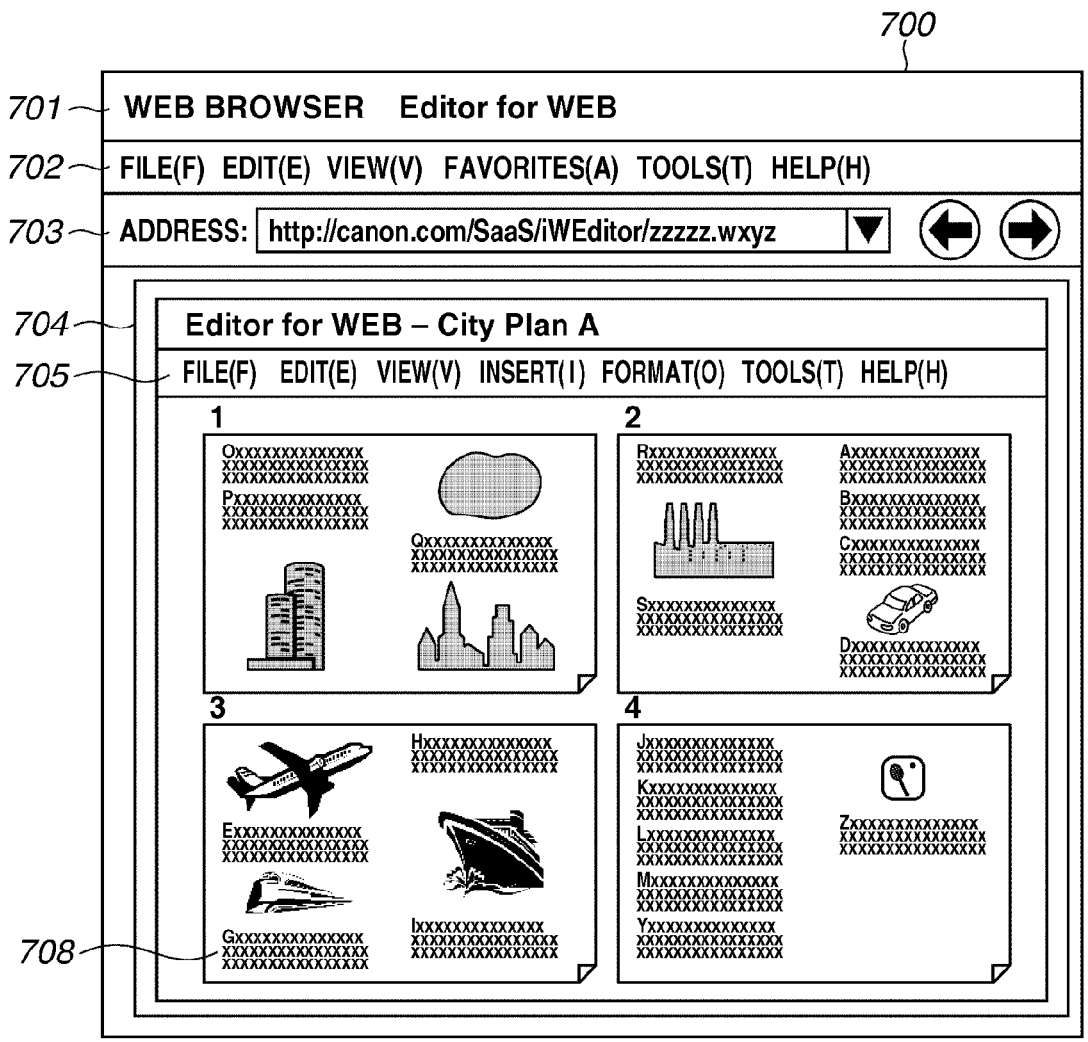
FIGS. 15A, 15B, and 15C are diagrams illustrating the UIs that output a message according to an exemplary embodiment of the present invention.
Figure 15B:
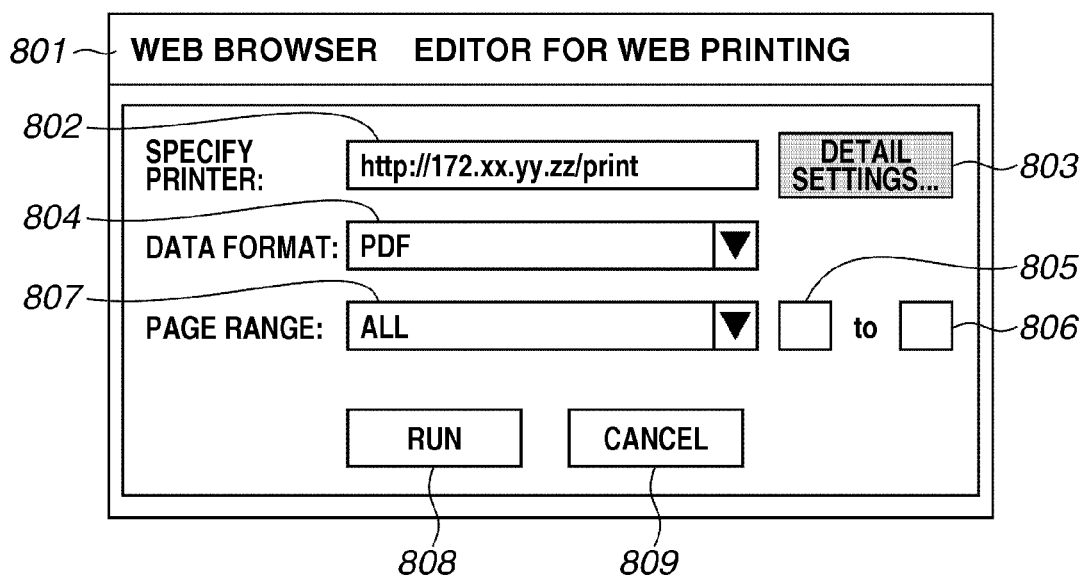
Figure 15C:
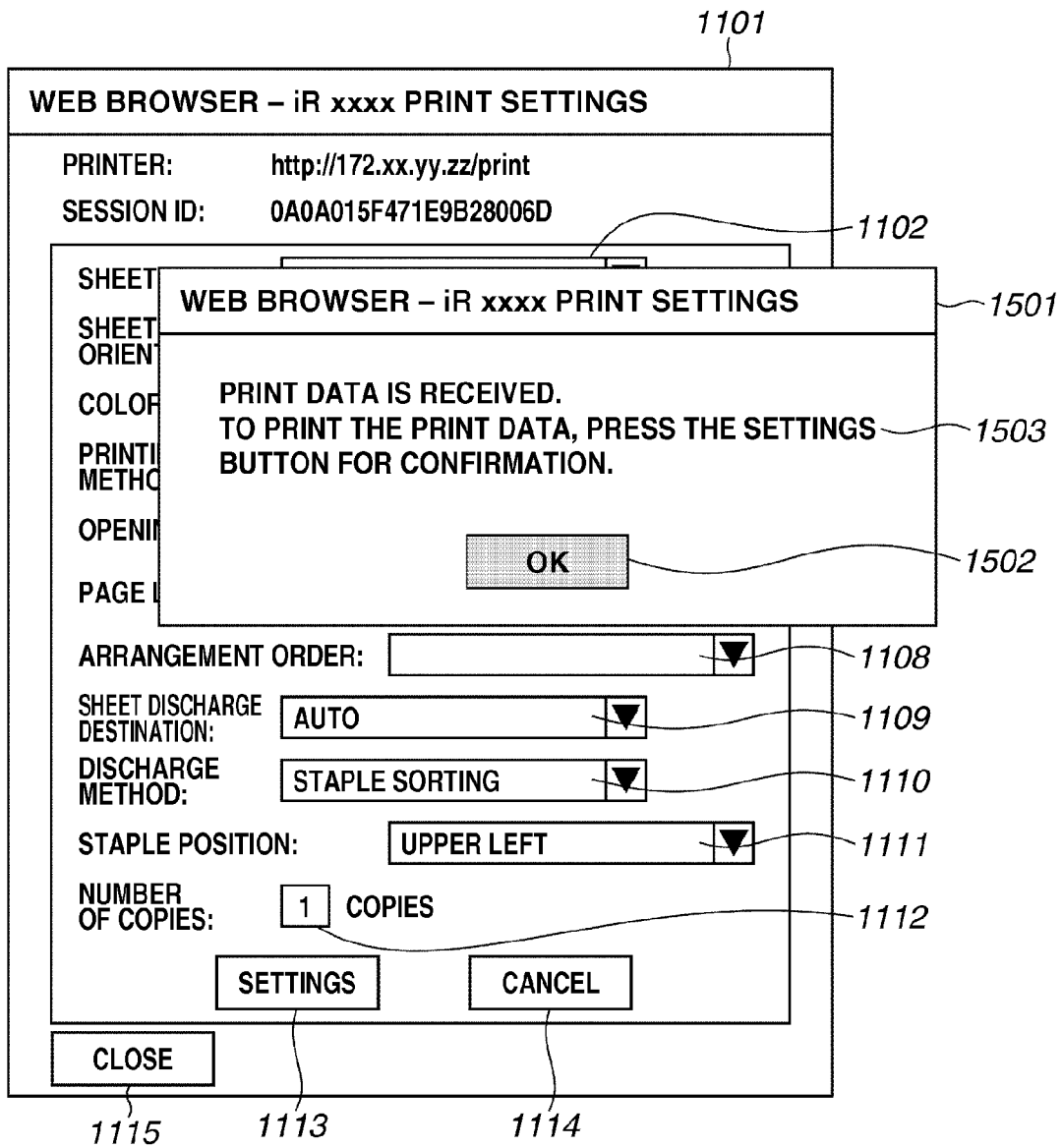

FIG. 15C is a diagram illustrating the popup window 1501 (UI) prompting confirmation of print settings of the printer 101 in the Web browser 700, shown in FIG. 15A, of the client PC 102. This is a result of displaying a Web page received from the printer 101 as an HTTP response to an HTTP request of a periodic page update by the Web browser 700 of the client PC 102 through processing in step S1402 by the Web print setting unit 402. FIG. 15B is a diagram corresponding to FIG. 8B illustrating a Web page for print instructions (UI) of a Web application in the Web browser 700 of the client PC 102.

The popup window 1501 is an example of a screen concerning the confirmation request of the print settings and includes an OK button 1502 and a message 1503. The popup window 1501 is opened as a new window of the Web browser 700 of the client PC 102. The OK button 1502 is a button to close the popup window. The message 1503 is a message to request the user to confirm print settings by pressing the setting button 1113.

Figure 16:
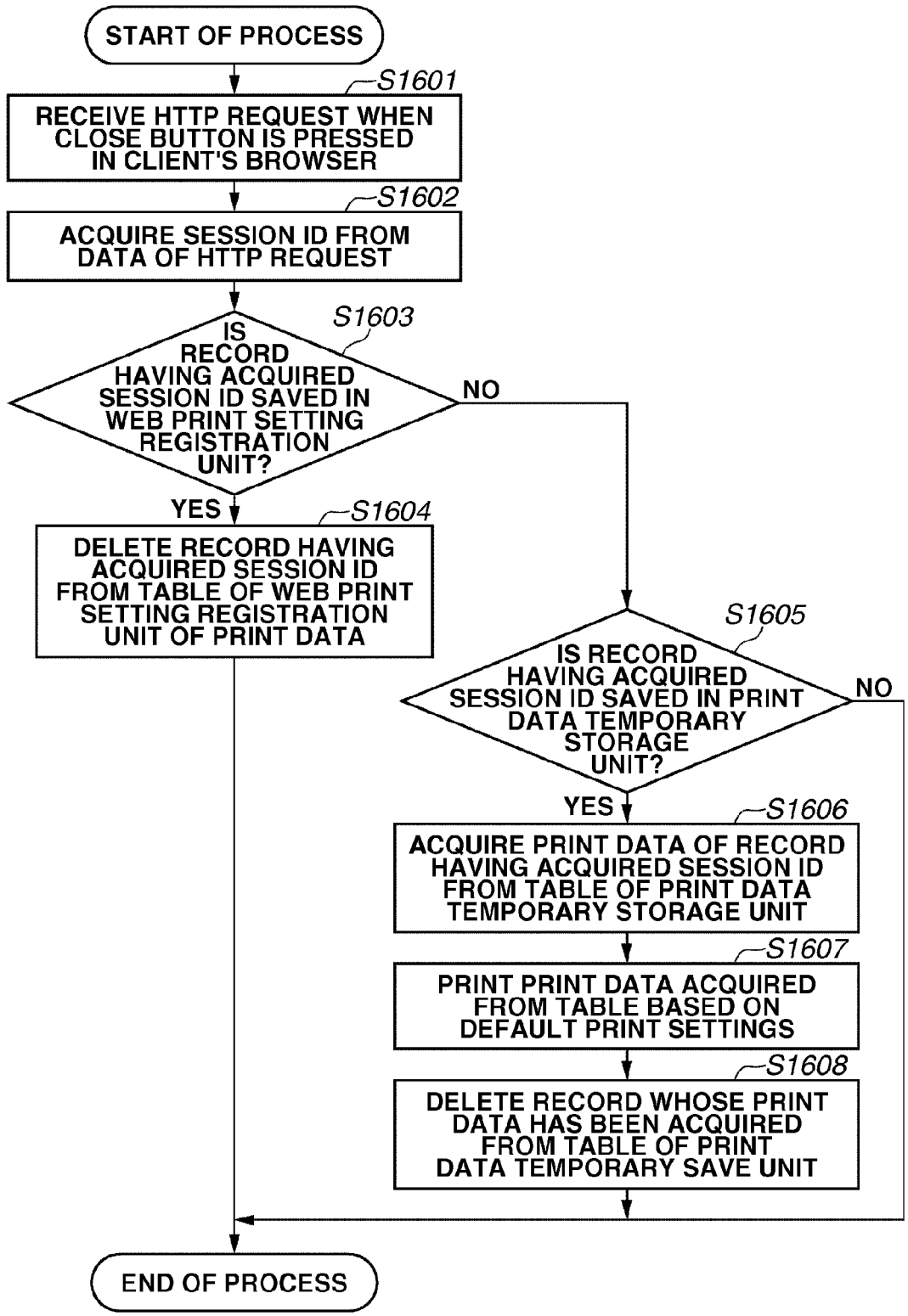
FIG. 16 is a flow chart illustrating processing concerning the printer according to an exemplary embodiment of the present invention.

FIG. 16 is a flow chart illustrating processing concerning the printer 101 when the close button 1115 is pressed in the window 1101 of the Web browser 700.

In step S1601, the Web print setting unit 402 of the printer 101 receives an HTTP request when the close button 1115 is pressed through the Web browser 700 via the Web server unit 401. The HTTP request is an example of a connection termination request. In step S1602, the Web print setting unit 402 acquires a session ID from the data of the HTTP request.

In step S1603, the Web print setting unit 402 determines whether there is any record having the session ID corresponding to the session ID acquired from the data of the HTTP request as a value of the session ID column 602 in the table 601 of the Web print setting registration unit 403.

If there is a record in the table 601 having the session ID corresponding to the acquired session ID in the session ID column 602 (YES in step S1603), in step S1604, the Web print setting unit 402 deletes the record from the table 601 of the Web print setting registration unit 403. The Web print setting unit 402 is an example of a deletion unit.

If, on the other hand, the Web print setting unit 402 determines that there is no record in the table 601 having the session ID corresponding to the acquired session ID in the session ID column 602 (NO in step S1603), the processing proceeds to step S1605.

In step S1605, the Web print setting unit 402 determines whether there is any record having the session ID corresponding to the session ID acquired from the data of the HTTP request as a value of the session ID column 612 in the table 611 of the print data temporary storage unit 404.

If there is a record in the table 611 having the session ID corresponding to the acquired session ID in the session ID column 612 (YES in step S1605), in step S1606, the Web print setting unit 402 acquires print data from the print data column 613 of the record.

In step S1607, the Web print setting unit 402 outputs an image signal and a control signal to the printer unit 206 for printing via the printer unit interface 205 based on setting values of default print settings of the printer 101, to print the acquired print data. In step S1608, the Web print setting unit 402 deletes the record from which the print data is acquired from the table 611 of the print data temporary storage unit 404.

If there arises a session in which a timeout has occurred in the Web server unit 401, the Web print setting unit 402 performs processing described above insteps S1603 to S1608 regarding the session ID of the session in which a timeout has occurred.

Figure 17:
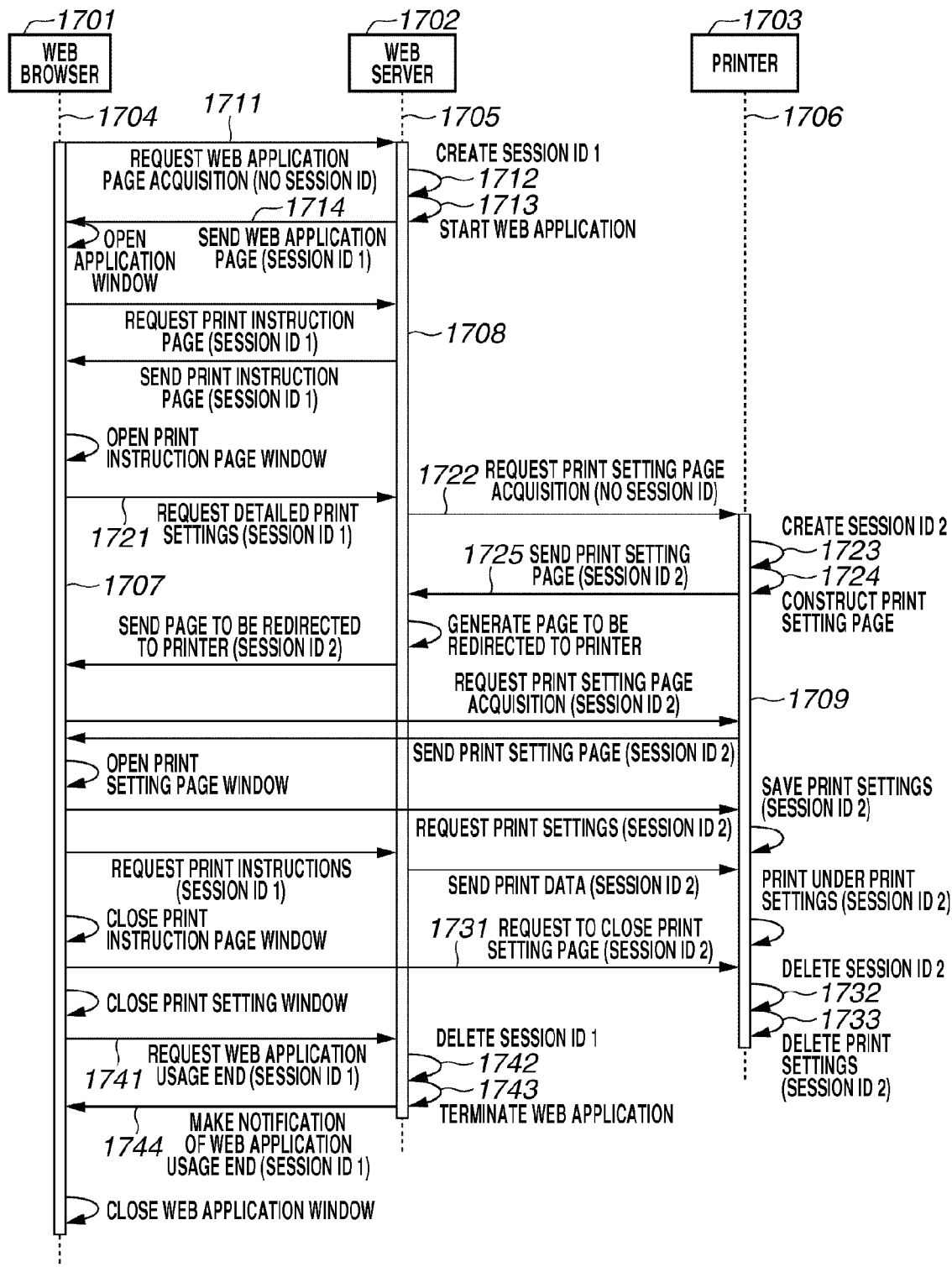
FIG. 17 is a sequence diagram illustrating generation and extinction of session IDs in time sequence according to an exemplary embodiment of the present invention.

FIG. 17 is a sequence diagram illustrating generation and extinction of session IDs in time sequence. The time axis is illustrated in a vertical direction of FIG. 17 and the time passes from the top toward the bottom in FIG. 17. In FIG. 17, an object 1701, an object 1702, and an object 1703 denote the Web browser 700 of the client PC 102, the Web application server 105, and the printer 101, respectively.

Object survival lines 1704 to 1706 indicate survival of each object of the Web browser 700, the Web application server 105, and the printer 101. Active intervals 1707 to 1709 indicate intervals in which each object of the Web browser 700, the Web application server 105, and the printer 101 is actually operating.

Information processing 1711 to 1714 indicates information processing such as exchange of messages between objects regarding generation of a session ID 1 used by the Web application server 105 for session management with the Web browser 700 that uses a Web application.

In the information processing 1711, the Web browser 700 of the client PC 102 transmits an HTTP request to the Web application server 105 to acquire an initial Web page of the Web application. The HTTP request contains no session ID.

In the information processing 1712, the Web application server 105 uses the Web server unit 501 to generate a new session ID (session ID 1).

In the information processing 1713, the Web application server 105 uses the Web application unit 503 to start the Web application for the new session ID (session ID 1).

In the information processing 1714, the Web application server 105 transmits a Web page of the started Web application to the Web browser 700 of the client PC 102 together with the new session ID (session ID 1) as an HTTP response.

Information processing 1721 to 1725 indicates information processing such as exchange of messages between objects regarding generation of a session ID 2 used by the printer 101 for management of print settings and execution of printing.

In the information processing 1721, the Web browser 700 of the client PC 102 transmits an HTTP request when the details setting button 803 is pressed to the Web application server 105. The HTTP request contains a session ID.

In the information processing 1722, like in step S903, the Web application server 105 transmits an HTTP request to acquire a Web page concerning print settings for the printer 101 specified by the URL to the printer 101. In this case, the Web application server 105 uses the Web server unit 501 and the Web application server unit 502. The HTTP request contains no session ID.

In the information processing 1723, like in step S1002, the printer 101 uses the Web server unit 401 to generate a new session ID (session ID 2).

In the information processing 1724, like in step S1003 the printer 101 uses the Web print setting unit 402 to construct a Web page concerning print settings for the new session ID (session ID 2).

In the information processing 1725, like in step S1004 the printer 101 transmits the constructed Web page concerning the print settings to the Web application server unit 502 of the Web application server 105 together with the new session ID (session ID 2).

Information processing 1731 to 1733 indicates information processing such as exchange of messages between objects regarding extinction of the session ID 2 used by the printer 101 for management of the print settings and execution of printing.

In the information processing 1731, the Web browser 700 of the client PC 102 transmits an HTTP request when the close button 1115 is pressed to the printer 101. The HTTP request contains the session ID 2.

In the information processing 1732, the printer 101 deletes session information regarding the session ID 2 in the Web server unit 401. Further, in the information processing 1733, the printer 101 deletes a print setting related to the session ID 2 from the Web print setting registration unit 403 following the flow chart of the Web print setting unit illustrated in FIG. 16.

Information processing 1741 to 1744 indicates information processing such as exchange of messages between objects regarding extinction of the session ID 1 used by the Web application server 105 for session management with the Web browser 700 using a Web application.

In the information processing 1741, the Web browser 700 of the client PC 102 transmits an HTTP request when an item to end the application is selected from the menu 705 of the Web application to the Web application server 105. The HTTP request contains the session ID 1.

In the information processing 1742, the Web application server 105 deletes session information regarding the session ID 1 in the Web server unit 501.

In the information processing 1743, the Web application server 105 uses the Web application server unit 502 to end the Web application for the session ID 1. When the Web application ends, the Web application server 105 deletes session information regarding the session ID 1 from the session ID save unit 505.

In the information processing 1744, the Web application server 105 transmits an ending Web page of the Web application in the Web server unit 501 to the Web browser 700 of the client PC 102 as an HTTP response.

Here, a public known method for printing a document created by a Web application will be described. As an example of the public known method, a method for using the print function of a Web browser is known.

According to this method, a screen of the Web application displayed in a frame of the Web browser is drawn for printing by the Web browser. Thus, if the Web application provides the function of print preview, the user may not be able to obtain a desired printing result because the Web browser and the Web application produce different drawing results.

Moreover, a method for performing printing by using a printer driver available on a Web application server providing the Web application from the Web application is known.

According to this method, printer drivers available on the Web application server are listed to allow the user to select a printer driver used for printing from the list. Thus, if a printer driver compatible with the printer to be used is not available on the Web application server, printing cannot be done.

If the number of printer drivers available on the Web application server is increased, it becomes necessary to prepare printer drivers for an unspecified large number of users, and thus, the cost spent for management thereof becomes large.

Further, a method for printing data after downloading printable data from the Web application server through the Web browser is known.

According to this method, a document edited by the Web application is acquired from the Web application in a general format such as PDF, XPS, and SVG, and the document is printed by using a printer driver of a local PC. Thus, if printing is performed a plurality of times while data is edited by the Web application, it is necessary to download data to be printed each time from the Web application server, which requires a lot of time and effort.

According to the configuration of the present exemplary embodiment, however, the above issues caused by publicly known methods do not arise.

Moreover, according to the configuration of the present exemplary embodiment, a situation in which even if the user registers a plurality of print settings with the printer 101 on a trial basis, the plurality of unused print settings remains in the printer 101 because such print settings are overwritten, can be avoided.

Further, according to the configuration of the present exemplary embodiment, a situation in which even if a plurality of users registers a plurality of print settings on a trial basis, more print settings than the number of session IDs are registered with the printer 101, can be avoided because print settings are managed for each session ID.

The configuration of the present exemplary embodiment does not generate a session ID to register print settings with the printer 101 each time the user transmits print data to the printer 101. Therefore, there is almost no possibility that a storage area of the printer 101 is occupied by unnecessary print settings.

Also, according to the configuration of the present exemplary embodiment, when a session with the printer 101 ends, a print setting related to the session ID thereof is deleted from the printer 101 and therefore, there is almost no possibility that the storage area of the printer 101 is occupied by print settings that are no longer used.

Further, there is no possibility that print settings that are no longer used remain in the printer 101 and therefore, there is no need for management by the user such as deletion of the print settings registered with the printer 101 by the user.

Also, according to the configuration of the present exemplary embodiment, one print setting is used in a session with the same printer 101 until the session ends. Thus, even if printing is done a plurality of times by the same printer 101 while data is edited by the Web application, there is no need for the user to revise the print setting each time. Therefore, the time necessary for the user to perform printing can be reduced.

According to the present invention, print setting information can be managed more appropriately.

Aspects of the present invention can also be realized by a computer of a system or apparatus (or devices such as a CPU, a micro-processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-274900 filed Dec. 2, 2009, which is hereby incorporated by reference herein in its entirety.

What is claimed is:

1. A printing apparatus that prints print data based on print setting information, the apparatus comprising:
    a storage unit configured to store the print setting information associated with a connection identifier (ID) in a storage device based on a print setting request containing the connection ID and the print setting information, wherein the connection ID is used for identifying a connection between the printing apparatus and a print request source, and wherein, in a case where the connection ID was previously stored in the storage device, the print setting information of the print setting request overwrites corresponding print setting information of the connection ID which was previously stored in the storage device;
    a print control unit configured to acquire the print setting information from the storage device and perform control so that the print data is printed based on the acquired print setting information if it is determined that the print setting information associated with the connection ID is stored in the storage device, based on a print request containing the connection ID and the print data; and
    a deletion unit configured to cancel the print request if cancellation of the print request is requested from the print request source, configured to terminate the connection between the printing apparatus and the print request source, and further configured to delete the print setting information from the storage device if it is determined that the print setting information associated with the connection ID is stored in the storage device based on a connection termination request containing the connection ID identifying the connection between the printing apparatus and the print request source.

2. The printing apparatus according to claim 1,
    wherein the print request source is a Web server apparatus that provides a screen concerning printing to a client terminal apparatus,
    wherein the storage unit stores the print setting information associated with the connection ID in the storage device based on the print setting request containing the connection ID identifying the connection between the printing apparatus and the Web server apparatus, and the print setting information set via a print setting screen of the client terminal apparatus from the client terminal apparatus,
    wherein the print control unit acquires the print setting information from the storage device, and performs control so that the print data is printed based on the acquired print setting information if it is determined that the print setting information associated with the connection ID is stored in the storage device based on the print request containing the connection ID identifying the connection between the printing apparatus and the Web server apparatus and the print data from the Web server apparatus, and
    wherein the deletion unit deletes the print setting information from the storage device if it is determined that the print setting information associated with the connection ID is stored in the storage device based on the connection termination request containing the connection ID identifying the connection between the printing apparatus and the Web server apparatus from the client terminal apparatus.

3. The printing apparatus according to claim 2, further comprising a confirmation request screen transmission unit that transmits a screen concerning a confirmation request of print settings to the client terminal apparatus if it is determined that the print setting information associated with the connection ID is not stored in the storage device based on the print request containing the connection ID identifying the connection between the printing apparatus and the Web server apparatus and the print data from the Web server apparatus.

4. The printing apparatus according to claim 3, further comprising an acquisition request response transmission unit that creates the connection ID and transmits a response containing the created connection ID and screen information concerning the print settings when an acquisition request of the screen information concerning the print settings is received from the Web server apparatus.

5. The printing apparatus according to claim 4, wherein the print request source receives the connection ID and embeds the received connection ID in the print setting request.

6. A printing method for printing print data based on print setting information, the method comprising:
   storing the print setting information associated with a connection identifier (ID) in a storage device based on a print setting request containing the connection ID and the print setting information, wherein the connection ID is used for identifying a connection between a printing apparatus and a print request source, and wherein, in a case where the connection ID was previously stored in the storage device, the print setting information of the print setting request overwrites a corresponding print setting information of the connection ID which was previously stored in the storage device;
   acquiring the print setting information from the storage device and performing control so that the print data is printed based on the acquired print setting information if it is determined that the print setting information associated with the connection ID is stored in the storage device, based on a print request containing the connection ID and the print data;
   cancelling the print request if cancellation of the print request is requested from the print request source; and
   terminating the connection between the printing apparatus and the print request source and deleting the print setting information from the storage device if it is determined that the print setting information associated with the connection ID is stored in the storage device based on a connection termination request containing the connection ID identifying the connection between the printing apparatus and the print request source.

7. A non-transitory storage medium storing a print program that causes a computer of a printing apparatus that prints print data based on print setting information to function as:
   a storage unit configured to store the print setting information associated with a connection identifier (ID) in a storage device based on a print setting request containing the connection ID and the print setting information, wherein the connection ID is used for identifying a connection between the printing apparatus and a print request source, wherein, in a case where the connection ID was previously stored in the storage device, the print setting information of the print setting request overwrites a corresponding print setting information of the connection ID which was previously stored in the storage device;
   a print control unit configured to acquire the print setting information from the storage device, and perform control so that the print data is printed based on the acquired print setting information if it is determined that the print setting information associated with the connection ID is stored in the storage device, based on a print request containing the connection ID and the print data; and
   a deletion unit configured to cancel the print request if cancellation of the print request is requested from the print request source, configured to terminate the connection between the printing apparatus and the print request source, and further configured to delete the print setting information from the storage device if it is determined that the print setting information associated with the connection ID is stored in the storage device based on a connection termination request containing the connection ID identifying the connection between the printing apparatus and the print request source.

8. The printing apparatus according to claim 1, wherein the storage unit includes a temporary storage device and a print setting registration unit, and
   wherein the temporary storage device stores an application connection ID and the print data and the print setting registration unit stores the connection ID and the print setting information.

9. The printing apparatus according to claim 8, wherein the print control unit is further configured to determine, upon receipt of the print setting request from a Web application, whether there is any record having the application connection ID in the temporary storage device corresponding to the connection ID, and
   wherein, in a case where it is determined that there is no record having the application connection ID, the print control unit saves the print setting information and the connection ID in the print setting registration unit.

10. The printing apparatus according to claim 9, wherein the application connection ID is a value used for connection management with a Web browser using the Web application, and
   wherein the print setting request is sent by the Web application.

11. The printing apparatus according to claim 8, wherein the print control unit is further configured to determine, upon receipt of the print setting request from a Web application, whether the print setting request contains the connection ID, and
   wherein, in a case where it is determined that the print setting request does not contain the connecting ID, the print control unit prints the print data based on setting values of default print settings of the printing apparatus.

12. The printing apparatus according to claim 8, wherein the print control unit is further configured to determine, upon receipt of the connection termination request from a Web application, whether the connection ID is stored in the storage device, and
   wherein, in a case where it is determined that the connection ID is stored in the print setting registration unit, the print setting unit deletes the connection ID and the print setting information stored in the print setting registration unit.

13. The printing apparatus according to claim 12, wherein, in a case where it is determined that the connection ID is not stored in the storage device, the print setting unit further determines whether the application connection ID is stored in the temporary storage device, and
   wherein, in a case where it is determined that the application connection ID is stored in the temporary device, the print control unit prints the print data based on setting values of default print settings of the printing apparatus.

14. The printing apparatus according to claim 13, wherein the print control unit deletes the print data and the application connection ID stored in the temporary storage device after the print control unit prints the print data based on setting values of default print settings of the printing apparatus.

\* \* \* \* \*